US009050707B2

(12) United States Patent
Fukuda et al.

(10) Patent No.: US 9,050,707 B2
(45) Date of Patent: Jun. 9, 2015

(54) METHOD FOR MANUFACTURING POLISHING PAD

(71) Applicants: Takeshi Fukuda, Osaka (JP); Tsuguo Watanabe, Osaka (JP); Junji Hirose, Osaka (JP); Kenji Nakamura, Osaka (JP); Masato Doura, Osaka (JP)

(72) Inventors: Takeshi Fukuda, Osaka (JP); Tsuguo Watanabe, Osaka (JP); Junji Hirose, Osaka (JP); Kenji Nakamura, Osaka (JP); Masato Doura, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 61 days.

(21) Appl. No.: 13/918,341
(22) Filed: Jun. 14, 2013
(65) Prior Publication Data
US 2013/0340351 A1 Dec. 26, 2013

Related U.S. Application Data

(62) Division of application No. 13/294,835, filed on Nov. 11, 2011, now Pat. No. 8,500,932, which is a division of application No. 12/297,862, filed as application No. PCT/JP2007/058493 on Apr. 19, 2007, now abandoned.

(30) Foreign Application Priority Data

Apr. 19, 2006 (JP) .................. 2006-115890
Apr. 19, 2006 (JP) .................. 2006-115897
Apr. 19, 2006 (JP) .................. 2006-115904
Apr. 19, 2006 (JP) .................. 2006-115907
Mar. 29, 2007 (JP) .................. 2007-088388

(51) Int. Cl.
B29C 44/24 (2006.01)
B29C 44/32 (2006.01)
(Continued)

(52) U.S. Cl.
CPC ......... *B24D 11/003* (2013.01); *Y10T 156/1059* (2015.01); *Y10T 156/1052* (2015.01);
(Continued)

(58) Field of Classification Search
CPC .... B29C 44/24; B29C 44/306; B29C 44/308; B29C 44/32; B29C 44/322; B29C 44/326; B24B 37/205; B24B 37/22; B24B 37/24; B24B 37/26

USPC .......... 156/78, 269; 264/46.2, 46.4, 46.5, 50; 51/296
See application file for complete search history.

(56) References Cited

U.S. PATENT DOCUMENTS 3,179,317 A    4/1965  Voelker
5,069,002 A   12/1991  Sandhu et al.
(Continued)

FOREIGN PATENT DOCUMENTS

EP    0 379 361    7/1990
JP    2-116538     5/1990
(Continued)

OTHER PUBLICATIONS

Notification of First Office Action mailed Nov. 22, 2013, directed to CN Application No. 201210073229.9; 22 pages.
(Continued)

*Primary Examiner* — Michael Tolin
(74) *Attorney, Agent, or Firm* — Morrison & Foerster LLP

(57) ABSTRACT

A method for manufacturing a polishing pad, which may be laminated, with a small number of manufacturing steps, high productivity and no peeling between a polishing layer and a cushion layer includes preparing a cell-dispersed urethane composition by a mechanical foaming method; continuously discharging the cell-dispersed urethane composition onto a face material, while feeding the face material; laminating another face material on the cell-dispersed urethane composition; curing the cell-dispersed urethane composition, while controlling its thickness to be uniform, so that a polishing layer including a polyurethane foam is formed; cutting the polishing layer parallel to the face into two pieces so that two long polishing layers each including the polishing layer and the face material are simultaneously formed; and cutting the long polishing layers to produce the polishing pad.

6 Claims, 8 Drawing Sheets

(51) Int. Cl.
    *B24B 37/22*     (2012.01)
    *B24B 37/24*     (2012.01)
    *B24B 37/26*     (2012.01)
    *B24D 11/00*     (2006.01)
    *B29C 44/30*     (2006.01)
    *B24B 37/20*     (2012.01)
    *B24D 3/32*      (2006.01)
    *B24D 18/00*     (2006.01)
    *B29C 44/56*     (2006.01)
    *C08J 9/30*      (2006.01)

(52) U.S. Cl.
    CPC ............... *B29C44/24* (2013.01); *B29C 44/308* (2013.01); *B29C 44/32* (2013.01); *B29C 44/322* (2013.01); *B24B 37/205* (2013.01); *B24B 37/24* (2013.01); *B24B 37/26* (2013.01); *B24B 37/22* (2013.01); *B24D 3/32* (2013.01); *B24D 18/00* (2013.01); *B29C 44/326* (2013.01); *B29C 44/5654* (2013.01); *C08J 9/30* (2013.01); *C08J 2375/08* (2013.01)

(56) References Cited

U.S. PATENT DOCUMENTS

| | | |
|---|---|---|
| 5,081,421 A | 1/1992 | Miller et al. |
| 5,491,175 A | 2/1996 | Miyazaki et al. |
| 5,605,760 A | 2/1997 | Roberts |
| 5,893,796 A | 4/1999 | Birang et al. |
| 5,946,991 A | 9/1999 | Hoopman |
| 5,964,643 A | 10/1999 | Birang et al. |
| 6,045,439 A | 4/2000 | Birang et al. |
| 6,080,215 A | 6/2000 | Stubbs et al. |
| 6,238,611 B1 | 5/2001 | Hoopman |
| 6,277,160 B1 | 8/2001 | Stubbs et al. |
| 6,280,290 B1 | 8/2001 | Birang et al. |
| 6,358,130 B1 | 3/2002 | Freeman et al. |
| 6,428,586 B1 | 8/2002 | Yancey |
| 6,439,968 B1 | 8/2002 | Obeng |
| 6,454,630 B1 | 9/2002 | Tolles |
| 6,524,164 B1 | 2/2003 | Tolles |
| 6,537,133 B1 | 3/2003 | Birang et al. |
| 6,676,717 B1 | 1/2004 | Birang et al. |
| 6,719,818 B1 | 4/2004 | Birang et al. |
| 6,777,455 B2 | 8/2004 | Seyanagi et al. |
| 6,876,454 B1 | 4/2005 | Birang et al. |
| 6,979,701 B2 | 12/2005 | Kaneda et al. |
| 7,341,502 B2 | 3/2008 | Elledge |
| 8,409,308 B2 | 4/2013 | Sato et al. |
| 2001/0023629 A1 | 9/2001 | Hoopman |
| 2001/0029770 A1 | 10/2001 | Hoopman |
| 2001/0036805 A1 | 11/2001 | Birang et al. |
| 2002/0004357 A1 | 1/2002 | Baker, III et al. |
| 2002/0183409 A1 | 12/2002 | Seyanagi et al. |
| 2003/0032378 A1 | 2/2003 | Ichimura et al. |
| 2003/0109197 A1 | 6/2003 | Tolles |
| 2003/0171070 A1 | 9/2003 | Tolles |
| 2003/0171081 A1 | 9/2003 | Komukai et al. |
| 2003/0190867 A1 | 10/2003 | Birang et al. |
| 2003/0217517 A1 | 11/2003 | Allison et al. |
| 2003/0233792 A1 | 12/2003 | Kramer |
| 2004/0014395 A1 | 1/2004 | Birang et al. |
| 2004/0094855 A1 | 5/2004 | Shih et al. |
| 2004/0096529 A1 | 5/2004 | Shih et al. |
| 2004/0102141 A1 | 5/2004 | Swisher et al. |
| 2004/0106357 A1 | 6/2004 | Birang et al. |
| 2004/0203320 A1 | 10/2004 | Hosaka et al. |
| 2004/0209066 A1 | 10/2004 | Swisher et al. |
| 2004/0224611 A1 | 11/2004 | Aoi et al. |
| 2005/0064709 A1 | 3/2005 | Shimomura et al. |
| 2005/0131091 A1 | 6/2005 | Shibanuma et al. |
| 2005/0170751 A1 | 8/2005 | Birang et al. |
| 2005/0245171 A1 | 11/2005 | Hosaka et al. |
| 2006/0014476 A1 | 1/2006 | Birang et al. |
| 2006/0037699 A1 | 2/2006 | Nakamori et al. |
| 2006/0079589 A1 | 4/2006 | Tadokoro et al. |
| 2006/0113705 A1 | 6/2006 | Shih et al. |
| 2006/0154568 A1 | 7/2006 | Tolles |
| 2006/0183412 A1 | 8/2006 | Allison et al. |
| 2006/0197249 A1 | 9/2006 | Shih et al. |
| 2006/0198992 A1 | 9/2006 | Shih et al. |
| 2006/0280929 A1 | 12/2006 | Shimomura et al. |
| 2006/0280930 A1 | 12/2006 | Shimomura et al. |
| 2007/0015441 A1 | 1/2007 | Birang et al. |
| 2007/0021037 A1 | 1/2007 | Birang et al. |
| 2007/0021045 A1 | 1/2007 | Swisher et al. |
| 2007/0066195 A1 | 3/2007 | Duong |
| 2007/0254564 A1 | 11/2007 | Song et al. |
| 2008/0063856 A1 | 3/2008 | Duong |
| 2008/0188163 A1 | 8/2008 | Duong |
| 2008/0227367 A1 | 9/2008 | Birang et al. |
| 2008/0305720 A1 | 12/2008 | Hirose et al. |
| 2009/0093202 A1 | 4/2009 | Fukuda et al. |
| 2009/0253353 A1 | 10/2009 | Ogawa et al. |

FOREIGN PATENT DOCUMENTS

| | | |
|---|---|---|
| JP | 4-159084 | 6/1992 |
| JP | 4-244847 | 9/1992 |
| JP | 7-237126 | 9/1995 |
| JP | 9-7985 | 1/1997 |
| JP | 10-83977 | 3/1998 |
| JP | 10-329005 | 12/1998 |
| JP | 11-510745 | 9/1999 |
| JP | 11-512874 | 11/1999 |
| JP | 11-512977 | 11/1999 |
| JP | 2001-291686 | 10/2001 |
| JP | 2003-53657 | 2/2003 |
| JP | 2003-510826 | 3/2003 |
| JP | 2003-516872 | 5/2003 |
| JP | 2003-517377 | 5/2003 |
| JP | 2003-220550 | 8/2003 |
| JP | 2004-1169 | 1/2004 |
| JP | 2004-25407 | 1/2004 |
| JP | 2004-42189 | 2/2004 |
| JP | 2004-169038 | 6/2004 |
| JP | 2004-188716 | 7/2004 |
| JP | 2004-343090 | 12/2004 |
| JP | 2005-210143 | 8/2005 |
| JP | 2006-159386 | 6/2006 |
| JP | 2006-187838 | 7/2006 |
| JP | 2007-61929 | 3/2007 |
| JP | 2007-88464 | 4/2007 |
| JP | 2007-284619 | 11/2007 |
| JP | 2008-100331 | 5/2008 |
| JP | 2008-100473 | 5/2008 |
| JP | 2008-101089 | 5/2008 |
| TW | I220405 | 11/2002 |
| TW | 592894 | 6/2004 |
| WO | WO-97/06921 | 2/1997 |
| WO | WO-97/11484 | 3/1997 |
| WO | WO-01/23141 | 4/2001 |
| WO | WO-01/43920 | 6/2001 |
| WO | WO-2004/049417 | 6/2004 |
| WO | WO-2006/062158 | 6/2006 |
| WO | WO-2007/119875 | 10/2007 |
| WO | WO-2008/047631 | 4/2008 |

OTHER PUBLICATIONS

Notification of the Second Office Action dated Jul. 21, 2014, directed to CN Application No. 201210073229.9; 22 pages.
International Search Report mailed Jun. 5, 2007, directed to International Application No. PCT/JP2007/058493; 2 pages.
Fukuda et al., U.S. Office Action mailed Sep. 2, 2009, directed to U.S. Appl. No. 12/297,862; 10 pages.
Fukuda et al., U.S. Office Action mailed Mar. 4, 2010, directed to U.S. Appl. No. 12/297,862; 16 pages.
Fukuda et al., U.S. Office Action mailed Jun. 30, 2011, directed to U.S. Appl. No. 12/297,862; 12 pages.
Fukuda et al., U.S. Office Action mailed Jan. 18, 2013, directed to U.S. Appl. No. 13/294,835; 13 pages.

(56) References Cited

OTHER PUBLICATIONS

Chinese Office Action dated Jan. 22, 2010, directed to Chinese Application No. 200780014189.8; 12 pages.
Korean Office Action dated Sep. 30, 2010, directed to Korean Application No. 10-2008-7020328; 9 pages.
Taiwanese Office Action dated Oct. 28, 2010, directed to Taiwanese Application No. 096113791; 23 pages.
Decision on Rejection dated Apr. 26, 2011, directed to Chinese Application No. 200780014189.8; 12 pages.
Taiwanese Office Action mailed Jun. 30, 2011, directed to Taiwanese Application No. 096113791; 11 pages.
Notification of Reasons for Refusal mailed Aug. 31, 2011, directed to Japanese Application No. 2006-115897; 4 pages.
Notification of First Office Action dated Nov. 22, 2011, directed to Chinese Application No. 201010209210.3; 6 pages.
Notification of Reasons for Refusal mailed Jan. 25, 2012, directed to Japanese Application No. 2006-115897; 4 pages.
Notification of First Office Action dated Mar. 1, 2012, directed to Chinese Application No. 201010209209.0; 10 pages.
Notification of the Second Office Action dated Dec. 5, 2012, directed to Chinese Application No. 201010209209.0; 12 pages.
Notification of the Third Office Action mailed Mar. 29, 2013, directed to Chinese Application No. 201010209209.0; 15 pages.
International Search Report mailed Aug. 19, 2008, directed to International Application No. PCT/JP2008/058911; 2 pages.
Sato et al., U.S. Office Action mailed May 12, 2011, directed to U.S. Appl. No. 12/601,725; 12 pages.
Sato et al., U.S. Office Action mailed Dec. 27, 2011, directed to U.S. Appl. No. 12/601,725; 12 pages.
Sato et al., U.S. Office Action mailed Apr. 26, 2012, directed to U.S. Appl. No. 12/601,725; 14 pages.
Sato et al., U.S. Office Action mailed Jul. 16, 2012, directed to U.S. Appl. No. 12/601,725; 10 pages.

METHOD FOR MANUFACTURING POLISHING PAD

REFERENCE TO RELATED APPLICATIONS

This application is a divisional of U.S. application Ser. No. 13/294,835, filed Nov. 11, 2011, now U.S. Pat. No. 8,500,932, which is a divisional of U.S. application Ser. No. 12/297,862, filed Oct. 20, 2008, now abandoned, which is a national stage application under 35 USC 371 of International Application No. PCT/JP2007/058493, filed Apr. 19, 2007, which claims the priority of Japanese Patent Application Nos. 2006-115890, filed Apr. 19, 2006, 2006-115897, filed Apr. 19, 2006, 2006-115904, filed Apr. 19, 2006, 2006-115907, filed Apr. 19, 2006, and 2007-088388, filed Mar. 29, 2007, the contents of all of which prior applications are incorporated herein by reference.

FIELD OF THE INVENTION

The present invention relates to a method for production of a (laminated) polishing pad by which the planarizing processing of optical materials such as lenses, reflecting mirrors and the like, silicon wafers, glass substrates for hard disks, aluminum substrates, and materials requiring a high degree of surface planarity such as those in general metal polishing processing can be carried out stably with high polishing efficiency. The (laminated) polishing pad obtained by the manufacturing method of the present invention is used particularly preferably in a process (a rough polishing process) of planarizing a silicone wafer, and a device having an oxide layer, a metal layer or the like formed on a silicon wafer, before lamination and formation of the oxide layer, the metal layer or the like. The (laminated) polishing pad of the invention is also suitable for use in final polishing of the surface of the materials and particularly useful for final polishing of silicon wafers and glass materials.

BACKGROUND OF THE INVENTION

Production of a semiconductor device involves a step of forming an electroconductive film on the surface of a wafer to form a wiring layer by photolithography, etching etc., a step of forming an interlaminar insulating film on the wiring layer, etc., and an uneven surface made of an electroconductive material such as metal and an insulating material is generated on the surface of a wafer by these steps. In recent years, processing for fine wiring and multilayer wiring is advancing for the purpose of higher integration of semiconductor integrated circuits, and accordingly techniques of planarizing an uneven surface of a wafer have become important.

As the method of planarizing an uneven surface of a wafer, a CMP method is generally used. CMP is a technique wherein while the surface of a wafer to be polished is pressed against a polishing surface of a polishing pad, the surface of the wafer is polished with an abrasive in the form of slurry having abrasive grains dispersed therein (hereinafter, referred to as slurry). As shown in FIG. 1, a polishing apparatus used generally in CMP is provided for example with a polishing platen 2 for supporting a polishing pad 1, a supporting stand (polishing head) 5 for supporting a polished material (wafer) 4, a backing material for uniformly pressurizing a wafer, and a mechanism of feeding an abrasive. The polishing pad 1 is fitted with the polishing platen 2 for example via a double-sided tape. The polishing platen 2 and the supporting stand 5 are provided with rotating shafts 6 and 7 respectively and are arranged such that the polishing pad 1 and the polished material 4, both of which are supported by them, are opposed to each other. The supporting stand 5 is provided with a pressurizing mechanism for pushing the polished material 4 against the polishing pad 1.

Conventionally, such polishing pads are produced by batch methods such as (1) a method including pouring a resin material into a mold to form a resin block and slicing the resin block with a slicer; (2) a method including pouring a resin material into a mold and pressing the resin material into a thin sheet form; and (3) a method including melting a resin material as a raw material and directly extruding the resin material from a T die into a sheet form. For example, Patent Document 1 discloses that polishing pads are produced by reaction injection molding.

Laminate polishing pads are produced by laminating, with an adhesive or double-side tape, a plurality of resin sheets, such as a polishing layer and a cushion layer, obtained by the method described above, and such a method for production of laminate polishing pads has the problems of a large number of production steps and low productivity rate. Patent Document 2 discloses that in order to solve the problems, laminate polishing pads are produced using an extruder.

A method for continuous production of a polyurethane/polyurea polishing sheet is proposed in order to prevent variations in hardness, gas cell size or the like, which would be caused by batch production methods (see Patent Document 3). Specifically, the method includes mixing a polyurethane material, a fine powder with a particle size of 300 μm or less and an organic foaming agent, ejecting the mixture between a pair of endless plane belts and casting the mixture, then subjecting the mixture to a polymerization reaction with heating means, and separating the resulting sheet-like product from the plane belts to obtain a polishing sheet material.

The polishing surface of polishing pads to be in contact with a substance to be polished is generally provided with grooves for holding and replacing a slurry. The polishing surface of polishing pads made of a foam has a large number of openings and thus has the function of holding and replacing a slurry. The polishing surface provided with grooves allows more efficient holding and replacing of a slurry and can prevent destruction of the polished substance, which is caused by adsorption on the polished substance. In conventional techniques, a polishing sheet is formed, and then the groove is formed by mechanical grinding or laser beam processing of the polishing surface of the polishing sheet. However, such conventional groove-forming processes are time-consuming and thus have the problem of low productivity.

As conventional polishing pads for use in high-precision polishing, polyurethane foam sheets are generally used. Polyurethane foam sheets are excellent in locally planarizing performance but have insufficient cushion performance, and therefore it is difficult to evenly apply a pressure to the entire surface of a wafer from such a polyurethane foam sheet. Thus, another soft cushion layer is generally provided on the back side of such a polyurethane foam sheet to form a laminate polishing pad for use in polishing processes. For example, the laminate polishing pads described below have been developed.

There is disclosed a polishing pad including: a laminate of a first relatively-hard layer and a second relatively-soft layer; and grooves with a certain pitch or projections with a certain form on the polishing surface of the first layer (see Patent Document 4).

It is also disclosed a polishing fabric including: a first sheet-like member having elasticity and irregularities on its surface; and a second sheet-like member that is provided on the surface of the first sheet-like member having irregularities and has a surface for facing the polished surface of an substrate to be treated (see Patent Document 5).

There is also disclosed a polishing pad including a polishing layer and a supporting layer that is laminated on one side of the polishing layer and made of a foam having a compression ratio higher than that of the polishing layer (see Patent Document 6).

However, the conventional laminate polishing pads have a problem in which since they are produced by bonding the polishing layer to the cushion layer with a double-side tape (a pressure-sensitive adhesive layer), a slurry can intrude between the polishing layer and the cushion layer during polishing to reduce the adhesion of the double-side tape so that the polishing layer can be detached from the cushion layer.

There is also disclosed a method for continuously producing a polishing product in which a regularly-shaped composite polishing material is adhered to a substrate (see Patent Document 7). There is further disclosed a method for continuously producing a polishing pad having an underlayer and a polishing layer for the purpose of reducing variation between the polishing pads (see Patent Document 8).

When such CMP is conducted, there is a problem of judging the planarity of wafer surface. That is, the point in time when desired surface properties or planar state are reached should be detected. With respect to the thickness of an oxide film, polishing speed etc., the polishing treatment of a test wafer has been conducted by periodically treating the wafer, and after the results are confirmed, a wafer serving as a product is subjected to polishing treatment.

In this method, however, the treatment time of a test wafer and the cost for the treatment are wasteful, and a test wafer and a product wafer not subjected to processing are different in polishing results due to a loading effect unique to CMP, and accurate prediction of processing results is difficult without actual processing of the product wafer.

Recently, therefore, in order to solve the above problem, there has been a demand for a method capable of detecting in situ the time when the desirable surface characteristics or the desirable thickness is obtained in the CMP process. While various methods are used for such detection, an optical detection method using a mechanism that monitors the film thickness with a laser beam and is incorporated in a rotary platen has been becoming mainstream in view of measurement accuracy and spatial resolution ability of non-contact measurement (see Patent Documents 9 and 10).

Specifically, the optical detection means is a method of irradiating a light beam to a wafer through a window (light transmitting region) and through a polishing pad and monitoring an interference signal produced by the reflection of the light beam to detect the end point of polishing.

At present, a He—Ne laser light having a wavelength light in the vicinity of 600 nm and a white light using a halogen lamp having a wavelength light in 380 to 800 nm is generally used.

In such method, the endpoint is determined by knowing an approximate depth of surface unevenness by monitoring a change in the thickness of a surface layer of a wafer. When such change in thickness becomes equal to the thickness of unevenness, the CMP process is finished. As a method of detecting the endpoint of polishing by such optical means and a polishing pad used in the method, various methods and polishing pads have been proposed.

A polishing pad having, as least a part thereof, a solid and uniform transparent polymer sheet passing a light of wavelengths of 190 to 3500 nm there through is disclosed (see Patent Document 11). Further, a polishing pad having a stepped transparent plug inserted into it is disclosed (see Patent Document 12). A polishing pad having a transparent plug on the same surface as a polishing surface is disclosed (see Patent Document 13).

Besides, a proposal is also offered for preventing a slurry from leaking out an interface (joint line) between a polishing region and a light-transmitting region (see Patent Documents 14 and 15). Even in a case where each of the proposed transparent leakage preventive sheets is provided, however, the slurry is leaked out from the interface therebetween up to the lower part of a polishing layer and accumulated on the leakage preventive sheet to thereby cause a problem in optical detection of an endpoint.

A wire width of an integrated circuit will be hereinafter expected so as to be increasingly narrower in the future tendency of higher integration and leveled-up supper compactness in a semiconductor fabrication and in such a situation, a necessity arises for a high precision optical detection of an endpoint, whereas a conventional detection window for an endpoint has had a problem of the slurry leakage insufficiently solved.

Patent Document 1: Japanese Patent Application Laid-Open (JP-A) No. 2004-42189
Patent Document 2: JP-A No. 2003-220550
Patent Document 3: JP-A No. 2004-169038
Patent Document 4: JP-A No. 2003-53657
Patent Document 5: JP-A No. 10-329005
Patent Document 6: JP-A No. 2004-25407
Patent Document 7: Japanese Patent Application National Publication (Laid-Open) No. 11-512874
Patent Document 8: Japanese Patent Application National Publication (Laid-Open) No. 2003-516872
Patent Document 9: U.S. Pat. No. 5,069,002
Patent Document 10: U.S. Pat. No. 5,081,421
Patent Document 11: Japanese Patent Application National Publication (Laid-Open) No. 11-512977
Patent Document 12: JP-A No. 9-7985
Patent Document 13: JP-A No. 10-83977
Patent Document 14: JP-A No. 2001-291686
Patent Document 15: Japanese Patent Application National Publication (Laid-Open) No. 2003-510826

SUMMARY OF THE INVENTION

An object of a first invention is to provide a method for manufacturing a polishing pad with a small number of manufacturing processes and high productivity. Another object of the invention is to provide a method for manufacturing a laminated polishing pad with a small number of manufacturing processes, high productivity and no peeling between a polishing layer and a cushion layer.

An object of a second invention is to provide a method for manufacturing a polishing pad with high productivity and high thickness accuracy. Another object of the invention is to provide a method for manufacturing a laminated polishing pad with high productivity, high thickness accuracy and no peeling between a polishing layer and a cushion layer.

A object of a third invention is to provide a method for manufacturing a polishing pad capable of preventing slurry leakage between a polishing region and a light transmitting region with high productivity. Another object of the invention is to provide a method for manufacturing a laminated polishing pad having no peeling between a polishing layer and a cushion layer and capable of preventing slurry leakage between a polishing region and a light transmitting region with high productivity.

An object of a fourth invention is to provide a method for manufacturing a groove-carrying polishing pad (hereinafter also simply referred to as "polishing pad") with a small number of manufacturing processes and high productivity and to provide a groove-carrying polishing pad obtained by such a manufacturing method. Another object of the invention is to provide a method for manufacturing a groove-carrying laminated polishing pad (hereinafter also simply referred to as "laminated polishing pad") with a small number of manufacturing processes, high productivity and no peeling between a polishing layer and a cushion layer and to provide a groove-carrying laminated polishing pad obtained by such a manufacturing method.

As a result of investigations for solving the problems described above, the inventors have found that the objects can be achieved by the (laminated) polishing pad-production method described below, and have completed the invention.

In the first invention, a method for manufacturing a polishing pad includes the steps of: preparing a cell-dispersed urethane composition by a mechanical foaming method; continuously discharging the cell-dispersed urethane composition onto a face material, while feeding the face material; laminating another face material on the cell-dispersed urethane composition; curing the cell-dispersed urethane composition, while controlling its thickness to be uniform, so that a polishing layer including a polyurethane foam is formed; cutting the polishing layer parallel to the face into two pieces so that two long polishing layers each including the polishing layer and the face material are simultaneously formed; and cutting the long polishing layers.

The manufacturing method allows simultaneous production of two long polishing layers each including a polishing layer and a face material and thus allows polishing pad production with excellent productivity. The resulting polishing layer may be used alone as a polishing pad, or a cushion layer may be laminated on one side of the resulting polishing layer to form a laminated polishing pad.

In the first invention, a method for manufacturing a laminated polishing pad includes the steps of: preparing a cell-dispersed urethane composition by a mechanical foaming method; continuously discharging the cell-dispersed urethane composition onto a cushion layer, while feeding the cushion layer; laminating another cushion layer on the cell-dispersed urethane composition; curing the cell-dispersed urethane composition, while controlling its thickness to be uniform, so that a polishing layer including a polyurethane foam is formed; cutting the polishing layer parallel to the face into two pieces so that two long laminated sheets each including the polishing layer and the cushion layer are simultaneously formed; and cutting the long laminated sheets.

The manufacturing method allows simultaneous production of two long laminated sheets each including a polishing layer and a cushion layer. The manufacturing method further allows omission of the step of bonding the polishing layer to the cushion layer and thus allows a reduction of manufacturing processes and allows production of laminated polishing pads with excellent productivity. In the laminated polishing pad obtained by the manufacturing method, the polishing layer is laminated directly on the cushion layer with no double-sided adhesive tape (adhesive layer). Therefore, the laminated polishing pad advantageously has no peeling between the polishing layer and the cushion layer during polishing.

In the second invention, a method for manufacturing a polishing pad includes the steps of: preparing a cell-dispersed urethane composition by a mechanical foaming method; providing spacers on both ends parts and/or an inner site of a face material, while feeding the face material; continuously discharging the cell-dispersed urethane composition onto a part of the face material where the spacer is not provided; laminating another face material on the discharged cell-dispersed urethane composition; curing the cell-dispersed urethane composition, while controlling its thickness to be uniform, so that a long polishing layer including a polyurethane foam is formed; and cutting the long polishing layer.

The manufacturing method allows continuous production of a long polishing layer and production of polishing pads with high productivity. In the manufacturing method, the spacers may be provided on both ends parts of the face material, before the cell-dispersed urethane composition is discharged onto the face material, so that the cell-dispersed urethane composition can be prevented from dripping out and that the accuracy of the thickness of the long polishing layer can be improved. In addition, providing the spacer on an inner site of the face material can solve the problem of a reduction in the thickness of the central part of the long polishing layer, so that the accuracy of the thickness of the long polishing layer can be further improved. Since the inner spacer constitutes a part of the polishing layer, it is necessary that it should not have any adverse effect on the polishing characteristics. The resulting polishing layer may be used alone as a polishing pad, or a cushion layer may be laminated on one side of the resulting polishing layer to form a laminated polishing pad.

The spacer is preferably made of a thermoplastic resin or a thermosetting resin. When the spacer is made of a thermoplastic resin, it is preferable that the spacer may be stored and may be supplied onto the face material in a wound state, and its effect on the polishing characteristics can be reduced. When the spacer is made of a thermosetting resin, the spacer is hard to deform so that the accuracy of the thickness of the long polishing layer can be further improved.

In addition, the spacer provided on the inner site preferably has a light transmittance of 20% or more through the wavelength range of 400 to 700 nm. Such a high light-transmittance spacer may be used as a light transmitting region (window) for detection of an optical end point or detection of an optical thickness. In the manufacturing method of the invention, the spacer (light transmitting region) is integrally formed in the polishing layer with no gap so that slurry leakage does not occur between the light transmitting region and the polishing region.

The spacer may also be made of a polyurethane foam whose composition is the same as that of the cell-dispersed urethane composition. In this case, the physical properties of the spacer are the same as those of the polishing region so that the polishing properties can be more uniform throughout the polishing pad. In addition, the spacer can be completely integrated with the polishing region so that slurry leakage can be completely prevented.

The spacer provided on the inner site may be a laminate of at least two peelable resin sheets. In this case, a part of the resin sheets may be separated after the long polishing layer is produced, so that the spacer may be made thinner than that of the polishing layer, which can reduce the effect of the spacer on the polishing characteristics or form a recessed structure for retention or replacement of a slurry. When the spacer is used as a light transmitting region, a part of the resin sheets is preferably separated such that the light transmittance can be improved. In this case, a part of the resin sheets on the back side of the polishing layer is preferably separated, because if a part of the resin sheets on the front side of the polishing layer is separated, a slurry can be held in the recessed structure formed on the front side to reduce the light transmittance.

In the second invention, a method for manufacturing a laminated polishing pad includes the steps of: preparing a cell-dispersed urethane composition by a mechanical foaming method; providing spacers on both ends parts and/or an inner site of a cushion layer, while feeding the cushion layer; continuously discharging the cell-dispersed urethane composition onto a part of the cushion layer where the spacer is not provided; laminating a face material on the discharged cell-dispersed urethane composition; curing the cell-dispersed urethane composition to form a polishing layer including a polyurethane foam, while controlling its thickness to be uniform, so that a long laminated sheet is formed; and cutting the long laminated sheet.

The manufacturing method allows continuous production of a laminated polishing pad including a polishing layer and a cushion layer. The manufacturing method also allows omission of the step of bonding the polishing layer to the cushion layer and thus allows a reduction of manufacturing processes and allows production of laminated polishing pads with high productivity. In the laminated polishing pad obtained by the manufacturing method, the polishing layer is laminated directly on the cushion layer with no double-sided adhesive tape (no adhesive layer). Therefore, the laminated polishing pad advantageously has no peeling between the polishing layer and the cushion layer during polishing. In addition, since the spacers are provided on both ends parts and/or an inner site of the cushion layer, before the cell-dispersed urethane composition is discharged onto the cushion layer, a similar advantage can be obtained as in the first invention.

For a similar reason as described above, the spacers are preferably made of a thermoplastic resin or a thermosetting resin.

The spacer provided on the inner site is preferably inserted in a through hole of the cushion layer and preferably provided so as to protrude from the cushion layer. When the cushion layer has a through hole in which the spacer is inserted, the spacer can be used as a light transmitting region (window) for detection of an optical end point or detection of an optical thickness. In such a case, the spacer provided on the inner site preferably has a light transmittance of 20% or more throughout the wavelength range of 400 to 700 nm. In the manufacturing method of the invention, the spacer (light transmitting region) is integrally formed in the polishing layer with no gap so that slurry leakage to the cushion layer does not occur between the light transmitting region and the polishing region.

For a similar reason as described above, the spacer may be made of a polyurethane foam whose composition is the same as that of the cell-dispersed urethane composition.

For a similar reason as described above, the spacer provided on the inner site may be a laminate of at least two peelable resin sheets.

In the third invention, a method for manufacturing a polishing pad includes the steps of: preparing a cell-dispersed urethane composition by a mechanical foaming method; continuously or intermittently discharging a light transmitting region-forming material onto a prescribed site of a face material, while feeding the face material; continuously discharging the cell-dispersed urethane composition onto a part of the face material where the light transmitting region-forming material is not provided; laminating another face material on the discharged light transmitting region-forming material and cell-dispersed urethane composition; curing the light transmitting region-forming material and the cell-dispersed urethane composition, while controlling their thickness to be uniform, so that a long polishing layer including a light transmitting region and a polishing region integrated therewith is formed; and cutting the long polishing layer.

The manufacturing method allows continuous production of a long polishing layer having a light transmitting region and allows production of polishing pads with high productivity. In addition, since the light transmitting region is integrated with the polishing region, slurry leakage does not occur between the light transmitting region and the polishing region during polishing. The resulting polishing layer may be used alone as a polishing pad, or a cushion layer may be laminated on one side of the resulting polishing layer to form a laminated polishing pad.

The light transmitting region-forming material preferably has a viscosity of 1 to 30 Pa·s when discharged. If the viscosity is less than 1 Pa·s at the time of discharging, the light transmitting region-forming material can have high fluidity and thus easily spread over the face material, so that it tends be difficult to provide the light transmitting region-forming material only on a prescribed position of the face material or it tends to be impossible to ensure the desired height of the provided light transmitting region-forming material. On the other hand, if the viscosity is more than 30 Pa·s, it tends to be difficult to control the intermittent discharge.

The cell-dispersed urethane composition preferably has a viscosity of 1 to 20 Pa·s when discharged. If the viscosity is less than 1 Pa·s at the time of discharging, the cell-dispersed urethane composition can have high fluidity and thus easily spread over the face material, so that it tends to be impossible to ensure the desired height of the provided cell-dispersed urethane composition. On the other hand, if the viscosity is more than 20 Pa·s, it tends to be difficult to uniformly provide the cell-dispersed urethane composition over the face material.

The light transmitting region is preferably made of a thermosetting resin, particularly preferably a thermosetting polyurethane resin. When the light transmitting region and the polishing region are made of a similar material, an adhesion between both regions can be improved. In addition, since the light transmitting region-forming material and the cell-dispersed urethane composition can be simultaneously cured by heating, the manufacturing process can be simple.

In the third invention, a method for manufacturing a laminated polishing pad includes the steps of: preparing a cell-dispersed urethane composition by a mechanical foaming method; discharging a light transmitting region-forming material such that the material is deposited in and on through holes, while feeding a cushion layer having continuously or intermittently provided through holes; continuously discharging the cell-dispersed urethane composition onto a part of the cushion layer where the light transmitting region-forming material is not provided; laminating a face material on the discharged light transmitting region-forming material and cell-dispersed urethane composition; curing the light transmitting region-forming material and the cell-dispersed urethane composition, while controlling their thickness to be uniform, so that a long laminated sheet including a light transmitting region and a polishing region integrated therewith is formed; and cutting the long laminated sheet.

The manufacturing method allows continuous production of a laminated polishing pad including a polishing layer and a cushion layer. The manufacturing method also allows omission of the step of bonding the polishing layer to the cushion layer and thus allows a reduction of manufacturing processes and allows production of laminated polishing pads with high productivity. In the laminated polishing pad obtained by the manufacturing method, the polishing layer is laminated directly on the cushion layer with no double-sided adhesive tape (no adhesive layer). Therefore, the laminated polishing pad advantageously has no peeling between the polishing layer and the cushion layer during polishing. In addition, since the light transmitting region is integrated with the polishing region, slurry leakage does not occur between the light transmitting region and the polishing region during polishing.

The light transmitting region-forming material preferably has a viscosity of 1 to 30 Pa·s when discharged. If the viscosity is less than 1 Pa·s at the time of discharging, the light transmitting region-forming material can have high fluidity and thus easily spread over the cushion layer, so that it tends to be difficult to provide the light transmitting region-forming material in such a manner that the material is deposited higher than the level of the through hole. If the viscosity is more than 30 Pa·s, it tends to be difficult to completely fill the through hole with the light transmitting region-forming material.

The cell-dispersed urethane composition preferably has a viscosity of 1 to 20 Pa·s when discharged. If the viscosity is less than 1 Pa·s at the time of discharging, the cell-dispersed urethane composition can have high fluidity and thus easily spread over the cushion layer, so that it tends to be impossible to ensure the desired height of the provided cell-dispersed urethane composition. If the viscosity is more than 20 Pa·s, it tends to be difficult to uniformly place the cell-dispersed urethane composition over the cushion layer.

For a similar reason as described above, the light transmitting region is preferably made of a thermosetting resin, particularly preferably a thermosetting polyurethane resin.

In the fourth invention, a method for manufacturing a groove-carrying polishing pad includes the steps of: preparing a cell-dispersed urethane composition by a mechanical foaming method; continuously discharging the cell-dispersed urethane composition onto a conveyor belt having a recessed structure; laminating a face material on the discharged cell-dispersed urethane composition; curing the cell-dispersed urethane composition, while controlling its thickness to be uniform, so that a groove-carrying long polishing layer including a polyurethane foam is formed; separating the groove-carrying long polishing layer from the conveyor belt; and cutting the groove-carrying long polishing layer.

In addition, in the fourth invention, a method for manufacturing a groove-carrying polishing pad includes the steps of: preparing a cell-dispersed urethane composition by a mechanical foaming method; continuously discharging the cell-dispersed urethane composition onto a release sheet having a recessed structure, while feeding the release sheet; laminating a face material on the discharged cell-dispersed urethane composition; curing the cell-dispersed urethane composition, while controlling its thickness to be uniform, so that a groove-carrying long polishing layer including a polyurethane foam is formed; separating the release sheet from the groove-carrying long polishing layer; and cutting the groove-carrying long polishing layer.

The manufacturing method allows continuous production of a groove-carrying long polishing layer and allows production of a groove-carrying polishing pad with high productivity. In forming the polishing layer, the recessed structure formed on the surface of the conveyor belt or the release sheet is transcribed onto the surface of the polishing layer so that a groove forming process by conventional techniques such as mechanical grinding can be omitted. The resulting groove-carrying long polishing layer may be used alone as a groove-carrying polishing pad, or a cushion layer may be laminated on one side of the resulting groove-carrying long polishing layer to form a groove-carrying laminated polishing pad.

In the fourth the invention, a method for manufacturing a groove-carrying laminated polishing pad includes the steps of: preparing a cell-dispersed urethane composition by a mechanical foaming method; continuously discharging the cell-dispersed urethane composition onto a conveyor belt having a recessed structure; laminating a cushion layer on the discharged cell-dispersed urethane composition; curing the cell-dispersed urethane composition, while controlling its thickness to be uniform, so that a groove-carrying long polishing layer including a polyurethane foam is formed and then a groove-carrying long laminated sheet is formed; separating the groove-carrying long laminated sheet from the conveyor belt; and cutting the groove-carrying long laminated sheet.

In the fourth invention, a method for manufacturing a groove-carrying laminated polishing pad includes the steps of: preparing a cell-dispersed urethane composition by a mechanical foaming method; continuously discharging the cell-dispersed urethane composition onto a release sheet having a recessed structure, while feeding the release sheet; laminating a cushion layer on the discharged cell-dispersed urethane composition; curing the cell-dispersed urethane composition, while controlling its thickness to be uniform, so that a groove-carrying long polishing layer including a polyurethane foam is formed and then a groove-carrying long laminated sheet is formed; separating the release sheet from the groove-carrying long laminated sheet; and cutting the groove-carrying long laminated sheet.

The manufacturing method allows continuous production of a groove-carrying laminated polishing pad including a groove-carrying polishing layer and a cushion layer. The manufacturing method also allows omission of the step of bonding the groove-carrying polishing layer to the cushion layer and thus allows a reduction of manufacturing processes and allows production of a groove-carrying laminated polishing pad with high productivity. In the groove-carrying laminated polishing pad obtained by the manufacturing method, the polishing layer is laminated directly on the cushion layer with no double-sided adhesive tape (no adhesive layer). Therefore, the laminated polishing pad advantageously has no peeling between the polishing layer and the cushion layer during polishing. In the process of forming the polishing layer, the recessed structure formed on the surface of the conveyor belt or the release sheet is transcribed onto the surface of the polishing layer so that a groove forming process by conventional techniques such as mechanical grinding can be omitted.

The invention is also directed to a (laminated) polishing pad produced by the method described above and to a method for production of a semiconductor device, including the step of polishing the surface of a semiconductor wafer with the (laminated) polishing pad.

DETAILED DESCRIPTION OF THE INVENTION

Figure 1:
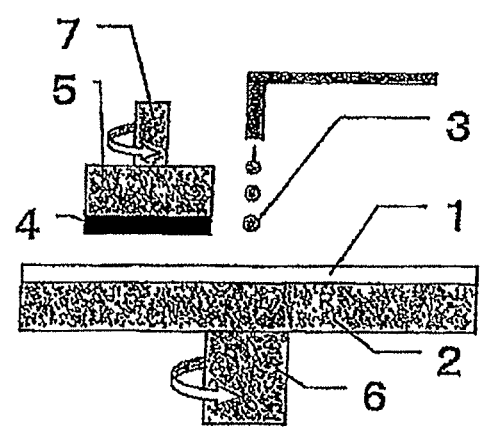
FIG. 1 is a schematic configuration diagram showing an example of a polishing apparatus for use in CMP polishing.

In the (laminated) polishing pad of the invention, the polishing layer (or the polishing region) is made of a polyurethane foam having closed cells (for rough polishing) or a polyurethane foam having open cells (for rough polishing or final polishing). Polyurethane is a preferred material for forming the polishing layer, because it has good abrasion resistance and because the polymer with the desired physical properties can be easily produced by varying the raw material composition.

The polyurethane comprises an isocyanate component, a polyol component (high-molecular-weight polyol, low-molecular-weight polyol etc.) and a chain extender.

As the isocyanate component, a compound known in the field of polyurethane can be used without particular limitation. The isocyanate component includes, for example, aromatic diisocyanates such as 2,4-toluene diisocyanate, 2,6-toluene diisocyanate, 2,2'-diphenyl methane diisocyanate, 2,4'-diphenyl methane diisocyanate, 4,4'-diphenyl methane diisocyanate, polymeric MDI, carbodiimide-modified MDI (for example, Millionate MTL made by Nippon Polyurethane Industry Co., Ltd.), 1,5-naphthalene diisocyanate, p-phenylene diisocyanate, m-phenylene diisocyanate, p-xylylene diisocyanate and m-xylylene diisocyanate, aliphatic diisocyanates such as ethylene diisocyanate, 2,2,4-trimethyl hexamethylene diisocyanate and 1,6-hexamethylene diisocyanate, and cycloaliphatic diisocyanates such as 1,4-cyclohexane diisocyanate, 4,4'-dicyclohexyl methane diisocyanate, isophorone diisocyanate and norbornane diisocyanate. These may be used alone or as a mixture of two or more thereof.

As the isocyanate component, it is possible to use not only the above-described diisocyanate compounds but also multifunctional (trifunctional or more) polyisocyanates. As the multifunctional isocyanate compounds, a series of diisocyanate adduct compounds are commercially available as Desmodul-N (Bayer) and Duranate™ (Asahi Chemical Industry Co., Ltd.).

Among the isocyanate components, when a polyurethane foam having fine closed cells is produced, the aromatic diisocyanate is preferably used in combination with the alicyclic diisocyanate, and in particular, toluene diisocyanate is preferably used in combination with dicyclohexylmethane diisocyanate. On the other hand, when a polyurethane foam having fine open cells is produced, 4,4-diphenylmethane diisocyanate or carbodiimide-modified MDI is preferably used.

As the high-molecular-weight polyol, a compound known in the field of polyurethane can be used without particular limitation. The high-molecular-weight polyol includes, for example, polyether polyols represented by polytetramethylene ether glycol and polyethylene glycol, polyester polyols represented by polybutylene adipate, polyester polycarbonate polyols exemplified by reaction products of polyester glycols such as polycaprolactone polyol and polycaprolactone with alkylene carbonate, polyester polycarbonate polyols obtained by reacting ethylene carbonate with a multivalent alcohol and reacting the resulting reaction mixture with an organic dicarboxylic acid, polycarbonate polyols obtained by ester exchange reaction of a polyhydroxyl compound with aryl carbonate, and polymer polyols such as polyether polyol in which polymer particles are dispersed. These may be used singly or as a mixture of two or more thereof.

To produce the polyurethane foam having an open cell structure, a polymer polyol is preferably used, and particularly a polymer polyol in which polymer particles comprising acrylonitrile and/or a styrene-acrylonitrile copolymer are dispersed is preferably used. This polymer polyol is contained in an amount of preferably 20 to 100% by weight, more preferably 30 to 60% by weight in the whole polymer polyol used. The high-molecular-weight polyol (including the polymer polyol) is contained in an amount of 60 to 85% by weight, more preferably 70 to 80% by weight in the active hydrogen-containing compound. By using the high-molecular-weight polyol in the specified amount, cell films are easily broken to easily form an open cell structure.

In the case of the open cell-structured polyurethane foam, among the high-molecular-weight polyols, a high-molecular-weight polyol having a hydroxyl value of 20 to 100 mg KOH/g is preferably used. The hydroxyl value is more preferably 25 to 60 mg KOH/g. When the hydroxyl value is less than 20 mg KOH/g, the amount of a hard segment in the polyurethane is reduced so that durability tends to be reduced, while when the hydroxyl value is greater than 100 mg KOH/g, the degree of crosslinking of the polyurethane foam becomes so high that the foam tends to be brittle.

In the case of the closed cell-structured polyurethane foam, the number-average molecular weight of the high-molecular-weight polyol is preferably, but not limited to, from 500 to 2000, in view of the elastic properties and the like of the resulting polyurethane resin. A polyurethane resin produced with a polyol of a number-average molecular weight less than 500 can have insufficient elastic properties and can be a brittle polymer. A polishing pad produced with such a polyurethane resin can be so hard that it can cause scratches on the wafer surface. Such a polishing pad can be easily worn away and therefore is not preferred in view of pad life. On the other hand, a polyurethane resin produced with a polyol of a number-average molecular weight more than 2000 can be so soft that it may tend to form a polishing layer with low flattening performance.

In the case of the open cell-structured polyurethane foam, a number-average molecular weight of the high-molecular-weight polyol is not particularly limited, but is preferably 1500 to 6000, from the viewpoint of the elastic characteristics of the resulting polyurethane. When the number-average molecular weight is less than 1500, the polyurethane obtained therefrom does not have sufficient elastic characteristics, thus easily becoming a brittle polymer. Accordingly, a foam made of this polyurethane is rigid to easily cause scratch of the polished surface of an object to be polished. On the other hand, when the number-average molecular weight is higher than 6000, polyurethane obtained therefrom becomes too soft. Therefore, a foam made of this polyurethane tends to be inferior in durability.

Examples of the low-molecular-weight polyol that can be used together with a high-molecular-weight polyol described above include: ethylene glycol, 1,2-propylene glycol, 1,3-propylene glycol, 1,2-butanediol, 1,3-butanediol, 1,4-butanediol, 2,3-butanediol, 1,6-hexanediol, neopentyl glycol, 1,4-cyclohexanedimethanol, 3-methyl-1,5-pentanediol, diethylene glycol, triethyleneglycol, 1,4-bis(2-hydroxyethoxy)benzene, trimethylolpropane, glycerin, 1,2,6-hexanetriol, pentaerythritol, tetramethylolcyclohexane, methyl glucoside, sorbitol, mannitol, dulcitol, sucrose, 2,2,6,6-tetrakis(hydroxymethyl)cyclohexanol, diethanolamine, N-methyldiethanolamine, triethanolamine and the like. Other examples that can be used together with the high-molecular-weight polyol also include: low-molecular-weight polyamine such as ethylenediamine, tolylenediamine, diphenylmethanediamine, diethylenetriamine and the like. Polyols to which alkylene oxides such as ethylene oxide and propylene oxide are added to the low-molecular-weight polyol or low-molecular-weight polyamine described above may be used together with a high-molecular-weight polyol described above. Still other examples that can be used together with the high-molecular-weight polyol also include: alcoholamines such as monoethanolamine, 2-(2-aminoethylamino)ethanol, monopropanolamine and the like. These low-molecular-weight polyols, high-molecular-weight polyamines etc. may be used alone or as a mixture of two or more thereof.

The ratio between the amounts of the high-molecular-weight polyol and the low-molecular-weight polyol in the polyol components may be determined depending on the desired characteristics of the polishing layer to be produced with the polyols.

In the case of the open cell-structured polyurethane foam, a low-molecular-weight polyol having a hydroxyl value of 400 to 1830 mg KOH/g and/or a low-molecular-weight polyamine having an amine value of 400 to 1870 mg KOH/g are preferably used. The hydroxyl value is more preferably 700 to 1250 mg KOH/g, and the amine value is more preferably 400 to 950 mg KOH/g. When the hydroxyl value is less than 400 mg KOH/g or the amine value is less than 400 mg KOH/g, an effect of improving formation of interconnected cells tends to be not sufficiently obtained. On the other hand, when the hydroxyl value is greater than 1830 mg KOH/g or the amine value is greater than 1870 mg KOH/g, a wafer tends to be easily scratched on the surface. Particularly, diethylene glycol, triethylene glycol or 1,4-butanediol is preferably used.

To produce the polyurethane foam having an open cell structure, the low-molecular-weight polyol, the low-molecular-weight polyamine and the alcohol amine are contained in the total amount of preferably 2 to 15 wt %, more preferably 5 to 10 wt %, in the active hydrogen-containing compound. By using the low-molecular-weight polyol etc. in specified amounts, cell films are easily broken to easily form an open cell structure and further the mechanical characteristics of the polyurethane foam are improved.

In the case where a polyurethane foam is produced by means of a prepolymer method, a chain extender is used in curing of a prepolymer. A chain extender is an organic compound having at least two active hydrogen groups and examples of the active hydrogen group include: a hydroxyl group, a primary or secondary amino group, a thiol group (SH) and the like. Concrete examples of the chain extender include: polyamines such as 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene oxide-di-p-aminobenzoate, 4,4'-diamino-3,3',5,5'-tetraethyldiphenylmethane, 4,4'-diamino-3,3'-diisopropyl-5,5'-dimethyldiphenylmethane, 4,4'-diamino-3,3',5,5'-tetraisopropyldiphenylmethane, 1,2-bis(2-aminophenylthio)ethane, 4,4'-diamino-3,3'-diethyl-5,5'-dimethyldiphenylmethane, N,N'-di-sec-butyl-4,4'-diaminophenylmethane, 3,3'-diethyl-4,4'-diaminodiphenylmethane, m-xylylenediamine, N,N'-di-sec-butyl-p-phenylenediamine, m-phenylenediamine and p-xylylenediamine; low-molecular-weight polyol component; and a low-molecular-weight polyamine component. The chain extenders described above may be used either alone or in mixture of two kinds or more.

A ratio between an isocyanate component, a polyol component and a chain extender can be altered in various ways according to molecular weights thereof, desired physical properties of polyurethane foam and the like. In order to obtain polyurethane foam with desired polishing characteristics, a ratio of the number of isocyanate groups in an isocyanate component relative to a total number of active hydrogen groups (hydroxyl groups+amino groups) in a polyol component and a chain extender is preferably in the range of from 0.80 to 1.20 and more preferably in the range of from 0.99 to 1.15. When the number of isocyanate groups is outside the aforementioned range, there is a tendency that curing deficiency is caused, required specific gravity and hardness are not obtained, and polishing property is deteriorated.

Manufacture of a polyurethane foam is enabled by means of either a prepolymer method or a one shot method, of which preferable is a prepolymer method in which an isocyanate-terminated prepolymer is synthesized from an isocyanate component and a polyol component in advance, with which a chain extender is reacted since physical properties of an obtained polyurethane resin is excellent.

Note that an isocyanate-terminated prepolymer with a molecular weight of the order in the range of from 800 to 5000 is preferable because of excellency in workability and physical properties.

Examples of the face material used in the invention include, but are not limited to, a paper, a cloth, a nonwoven fabric, a resin film and the like, and a resin film having heat resistance and flexibility is particularly preferred.

Examples of the resin for forming the face material include polyethylene terephthalate, polyester, polyethylene, polypropylene, polystyrene, polyimide, polyvinyl alcohol, polyvinyl chloride, fluororesin such as polyfluoroethylene, nylon, cellulose and the like.

The thickness of the face material is preferably, but not limited to, from about 20 to about 200 nm in view of strength, winding and the like. The width of the face material is preferably, but not limited to, from about 60 to about 250 cm in view of the required size of the polishing layer.

When a rough polishing pad is produced, the surface of the face material is preferably subjected to release treatment so that the process of separating the face material can be easily performed after a long polishing layer is formed.

When a final polishing pad is produced, a base material may be used as the face material. Examples of the base material include, but are not limited to, a plastic film such as nylon, polypropylene, polyethylene, polyester, and polyvinyl chloride; a nonwoven fabric such as a nonwoven polyester fabric, a nonwoven nylon fabric and a nonwoven acrylic fabric; a resin impregnated nonwoven fabric such as a polyurethane-impregnated nonwoven polyester fabric; a polymer resin foam such as a polyurethane foam and a polyethylene foam; a rubber resin such as butadiene rubber and isoprene rubber; a photosensitive resin and the like. Among them, a plastic film such as nylon, polypropylene, polyethylene, polyester, and polyvinyl chloride or a polymer resin foam such as a polyurethane foam and a polyethylene foam is preferably used. A single-sided adhesive tape may also be used as the face material. A base material for the single-sided adhesive tape may be a plastic film such as polyethylene terephthalate and polypropylene film and preferably a polyethylene terephthalate. The base material for the single-sided adhesive tape preferably has a thickness of about 20 to about 200 μm. For example, the adhesive layer may be composed of a rubber-based adhesive, an acrylic adhesive or the like.

In order to impart toughness to the final polishing pad, the base material is preferably as hard as or harder than the polyurethane foam. The thickness of the base material is preferably, but not limited to, from 20 to 1000 μm, and more preferably from 50 to 800 μm, in view of strength, flexibility and on the like.

The cushion layer compensates for characteristics of the polishing layer. The cushion layer is required for satisfying both planarity and uniformity which are in a tradeoff relationship in CMP. Planarity refers to flatness of a pattern region upon polishing an object of polishing having fine unevenness generated upon pattern formation, and uniformity refers to the uniformity of the whole of an object of polishing. Planarity is improved by the characteristics of the polishing layer, while uniformity is improved by the characteristics of the cushion layer. The cushion layer used in the laminated polishing pad of the present invention is softer than the polishing layer.

The material forming the cushion layer is not particularly limited, and examples of such material include a nonwoven fabric such as a polyester nonwoven fabric, a nylon nonwoven fabric or an acrylic nonwoven fabric, a nonwoven fabric impregnated with resin such as a polyester nonwoven fabric impregnated with polyurethane, polymer resin foam such as polyurethane foam and polyethylene foam, rubber resin such as butadiene rubber and isoprene rubber, and photosensitive resin.

The thickness of the cushion layer is generally, but not limited to, about 0.5 to 1.5 mm, and preferably 0.5 to 1.0 mm. In addition, the width of the cushion layer is preferably, but not limited to, from about 60 to about 250 cm in view of the required size of the laminated polishing pad.

When the hardness of the cushion layer is outside the aforementioned range, there is a tendency that the uniformity of the substance to be polished is deteriorated.

Examples of a raw material of the spacer used in the second invention include, but are not limited to, a thermoplastic resin such as a polyurethane resin, a polyester resin, a polyamide resin, a cellulose-based resin, an acrylic resin, a polycarbonate resin, a halogenated resin (such as polyvinyl chloride, polytetrafluoroethylene and polyvinylidene fluoride), polystyrene, and an olefin-based resin (such as polyethylene and polypropylene); a thermosetting resin such as an acrylic resin, a polyurethane resin, an acrylic urethane resin, a phenol resin, and an epoxy resin; rubber such as natural rubber, isoprene rubber, butadiene rubber, chloroprene rubber, styrene-butadiene rubber, reclaimed rubber, polyisobutylene rubber, styrene-isoprene-styrene rubber, and styrene-butadiene-styrene rubber; a silicone resin such as dimethylpolysiloxane and diphenylpolysiloxane, and the like. Among them, a thermoplastic resin or a thermosetting resin is preferably used. In particular, a thermoplastic polyurethane resin (TPU) or a thermosetting polyurethane resin is preferably used. The spacer may be any of a foam material or a non-foam material.

When the spacer placed inside is used to form a light transmitting region, the light transmittance of the spacer is preferably 20% or more, and more preferably 50% or more, throughout a wavelength range of 400 to 700 nm. Examples of materials capable of exhibiting such light transmittance include a thermoplastic urethane-based resin, a thermoplastic olefin-based resin, a thermoplastic styrene-based resin, a thermoplastic ester-based resin, a thermosetting acrylic-based resin, a thermosetting urethane-based resin, a thermosetting acrylic urethane-based resin, a thermosetting phenol-based resin, a thermosetting epoxy-based resin and the like. When the spacer is used to form a light transmitting region, the spacer is preferably made of a non-foam material in terms of improving the light transmittance.

A shape of the spacer is not particularly limited, but the spacer preferably has a rectangular cross section. When the spacer has a rectangular cross section, the spacer preferably has a width of about 0.5 to about 2.0 cm in consideration of maintaining morphological stability and keeping the polishing region substantially involved in polishing as large as possible, and the spacer preferably has a height of about 0.1 to about 0.4 cm in consideration of the thickness of the polishing layer. For example, a single layer-type spacer may be produced by such as a method of forming a cord-shaped spacer by extrusion or a method of spirally cutting a cylindrically extruded resin block into cord-shaped spacers. Alternatively, the spacer may be a laminated spacer that is a laminate of two or more peelable resin sheets. For example, the laminated spacer may be produced by sequentially extruding and laminating resin materials on an extruded resin sheet.

The hardness of the spacer is preferably, but not limited to, from 30 to 70 degrees, and more preferably from 40 to 60 degrees in terms of Asker D hardness. If the hardness is less than 30 degrees, the flattening performance can be low. If the hardness is more than 70 degrees, scratches may tend to be formed on the surface of a workpiece.

In the third invention, the light transmitting region-forming material is not limited, but a light transmittance thereof is preferably 20% or more and more preferably 50% or more at a wavelength over all the range of from 400 to 700 nm in wavelength. Examples of such a material include: thermoset resins such as a polyurethane resin, a polyester resin, a phenol resin, a urea resin, a melamine resin, an epoxy resin and an acrylic resin; thermoplastic resins such as a polyurethane resin, a polyester resin, a polyamide resin, a cellulose-based resin, an acrylic resin, a polycarbonate, a halogen containing resin (polyvinyl chloride, polytetrafluoroethylene, polyvinylidene fluoride and the like), a polystyrene and an olefinic resin (polyethylene, polypropylene and the like); and rubbers such as a butadiene rubber and an isoprene rubber; light curable resins curable with irradiation of light such as ultraviolet and an electron beam; and photosensitive resins. The resins may be used either alone or in combination of two or more kinds. Note that a thermoset resin is preferably cured at a comparative low temperature. In a case where a light curable resin is employed, a photo-polymerization initiator is preferably employed together. Among these, thermoset resins are preferably used, and particularly a thermoset polyurethane resin is preferably used.

In the fourth invention, a conveyor belt and a release sheet are used for continuous production of a groove-carrying long polishing layer. The conveyor belt and the release sheet each has a recessed structure on its surface and has a function to transcribe the recessed structure onto the surface of the polishing layer so that a groove is formed on the surface of the polishing layer.

Examples of the material for forming the conveyor belt include, but are not limited to, urethane, polyvinyl chloride, fluororesin, rubber, metal and the like. In view of abrasion resistance and flexibility, urethane is preferably used. In view of flexibility and releasability, fluororesin is also preferably used.

Examples of the material for forming the release sheet include, but are not limited to, polyethylene terephthalate, polyester, polyethylene, polypropylene, polystyrene, polyvinyl chloride, fluororesin, nylon, cellulose and the like. In view of strength, flexibility and releasability, polyethylene terephthalate or polypropylene is preferably used.

The surface of the conveyor belt and the release sheet has preferably been subjected to release treatment. Particularly when polyethylene terephthalate is used, release treatment is should be performed. Release treatment facilitates the process of separating the resulting groove-carrying long polishing layer.

The recessed structure formed on the surface of the conveyor belt and the release sheet is not particularly limited, as long as it can form, on the surface of the polishing layer, a structure that allows retention and replacement of slurry. Examples of the shape include rectangle, polygon, triangle, circle, concentric circle, spiral, eccentric circle, radial shape, and any combination thereof. While the recessed structure generally has regularity, the pitch, width, depth, and the like of the recessed structure may each be changed by a certain region in order to retain and replace the slurry in a desired manner.

Figure 2:
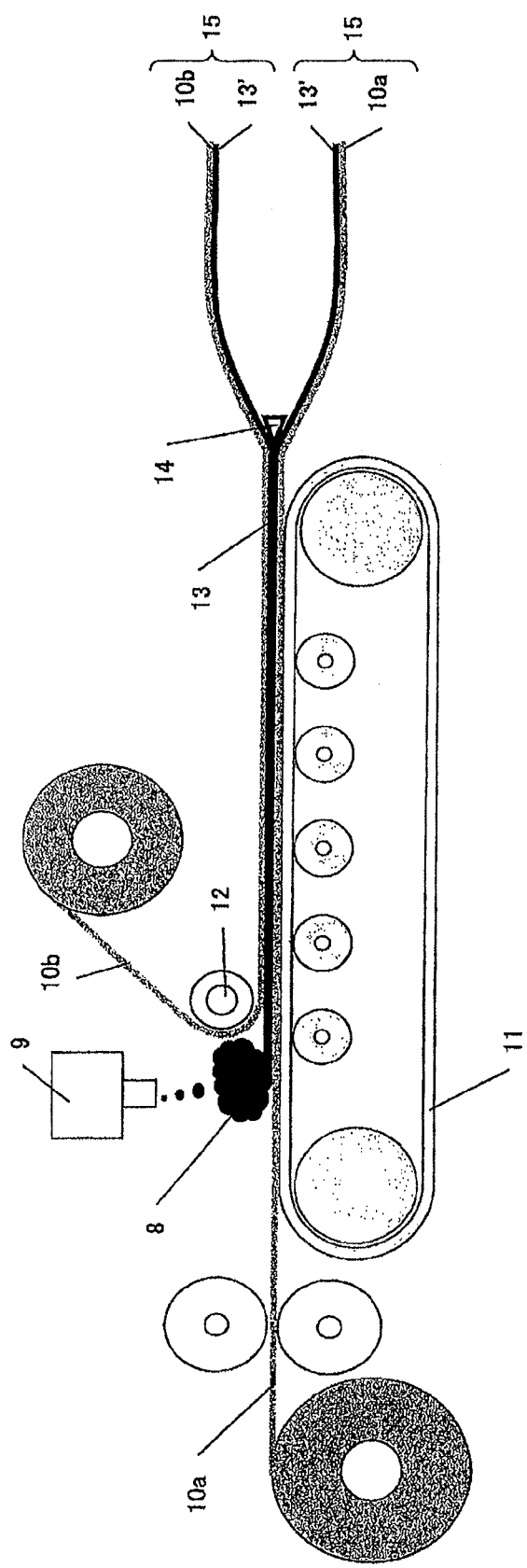
FIG. 2 is a schematic diagram showing a production step of a long laminated polishing layer or a long laminated sheet according to the first invention.
Figure 3:
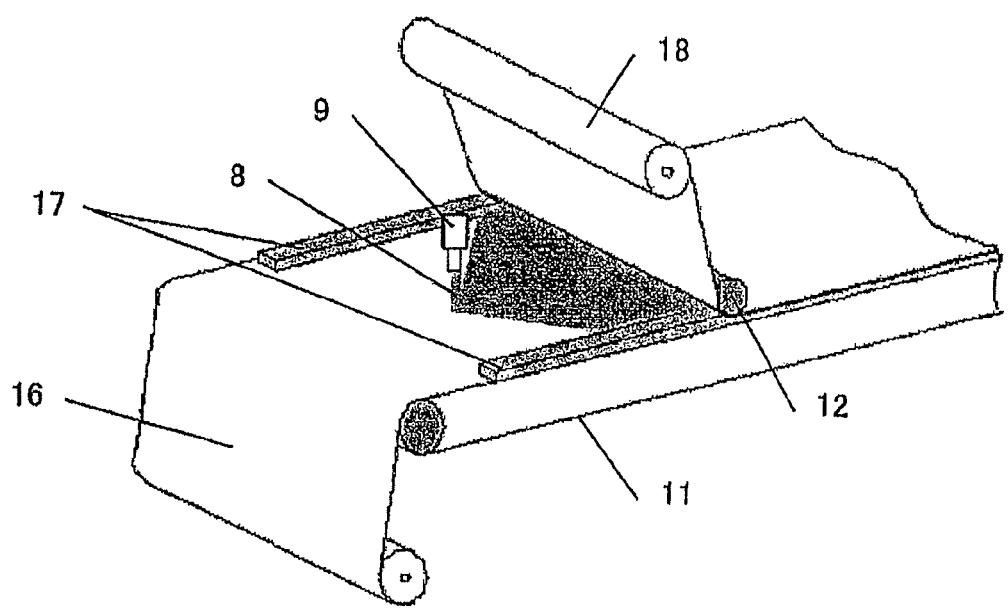
FIG. 3 is a schematic diagram showing a production step of a long laminated polishing layer or a long laminated sheet according to the second invention.

The method for manufacturing a (laminated) polishing pad according to the first invention is described below. FIG. 2 is a schematic diagram showing a process for manufacturing a long polishing layer or a long laminated sheet according to the invention.

A cell-dispersed urethane composition 8 may only be prepared by a mechanical foaming method (including a mechanical frothing method), and the other features of the composition 8 are not particularly limited. For example, the cell-dispersed urethane composition may be prepared by the method described below.

(1) The first component wherein a silicon-based surfactant is added to an isocyanate-terminated prepolymer produced by an isocyanate component with a high-molecular-weight polyol or the like is mechanically stirred in the presence of an unreactive gas, to disperse the unreactive gas as fine cells thereby forming a cell dispersion. Then, the second component containing active hydrogen-containing compounds such as low-molecular-weight polyols and low-molecular-weight polyamines are added to, and mixed with, the cell dispersion to prepare a cell dispersed urethane composition. If necessary, a catalyst and a filler such as carbon black may be added to the second component.

(2) A silicon-based surfactant is added to the first component containing an isocyanate component (or an isocyanate-terminated prepolymer) and/or the second component containing active hydrogen-containing compounds, and the component(s) to which the silicon-based surfactant is added is mechanically stirred in the presence of an unreactive gas, to disperse the unreactive gas as fine cells thereby forming a cell dispersion. Then, the remaining component is added to, and mixed with, the cell dispersion to prepare a cell dispersed urethane composition.

(3) A silicon-based surfactant is added to at least either of the first component containing an isocyanate component (or an isocyanate-terminated prepolymer) or the second component containing active hydrogen-containing compounds, and the first and second components are mechanically stirred in the presence of an unreactive gas, to disperse the unreactive gas as fine cells thereby preparing a cell dispersed urethane composition.

Alternatively, the cell dispersed urethane composition 8 may be prepared by a mechanical frothing method. The mechanical frothing method is a method wherein starting components are introduced into a mixing head 9, while an unreactive gas is mixed therein, and the mixture is mixed under stirring with a mixer such as an Oaks mixer thereby dispersing the unreactive gas in a fine-cell state in the starting mixture. The mechanical frothing method is a preferable method because a density of the polyurethane foam can be easily adjusted by regulating the amount of an unreactive gas mixed therein. If necessary, hollow beads may be added to the urethane composition. However, the content of the hollow beads to be added is preferably 5% by weight or less, and more preferably 3% by weight or less, based on the volume of the urethane composition. If the content of the hollow beads to be added is more than 5% by weight, the urethane composition containing the hollow beads may have high viscosity so that the polyurethane foam may tend to have poor formability.

The unreactive gas used for forming fine bubbles is preferably not combustible, and is specifically nitrogen, oxygen, a carbon dioxide gas, a rare gas such as helium and argon, and a mixed gas thereof, and the air dried to remove water is most preferable in respect of cost.

In preparing the cell-dispersed urethane composition, a silicone surfactant that is a copolymer of polyalkylsiloxane and polyether and has no active hydrogen group is preferably added to the raw material component. Examples of preferred compounds of such a silicone surfactant include SH-190, SH-192 and L-5340 (manufactured by Dow Corning Toray Co., Ltd.), and the like. The amount of addition of the silicone surfactant in the polyurethane foam is preferably from 0.05% to 5% by weight. If the amount is less than 0.05% by weight, the foam with fine cells can tend to be difficult to be obtained. If the amount is more than 5% by weight, a high-hardness polyurethane foam can tend to be difficult to be obtained. If necessary, a stabilizing agent such as an antioxidant, a lubricant, a pigment, a filler, an antistatic agent and any other additive may be added.

Known polyurethane-reaction-promoting catalysts may also be used, such as tertiary amine catalysts. The type and the amount of addition of the catalyst may be appropriately chosen depending on the flow time after the ejection of the cell-dispersed urethane composition onto the face material (base material) or the cushion layer.

As a stirring device for dispersing an unreactive gas in a fine-cell state, any known stirring deices can be used without particular limitation, and specific examples include a homogenizer, a dissolver, a twin-screw planetary mixer, a mechanical froth foaming machine etc. The shape of a stirring blade of the stirring device is not particularly limited, and a whipper-type stirring blade is preferably used to form fine cells. For obtaining the intended polyurethane foam, the number of revolutions of the stirring blade is preferably from 500 to 2000 rpm, more preferably from 800 to 1500 rpm. The stirring time is suitably regulated depending on the intended density.

In a preferable mode, different stirring devices are used for preparing a cell dispersion in the foaming process and for stirring the first and the second components to mix them, respectively. Stirring in the mixing step may not be stirring for forming cells, and a stirring device not generating large cells is preferably used in the mixing step. Such a stirring device is preferably a planetary mixer. The same stirring device may be used in the foaming step of preparing a cell dispersion and in the mixing step of mixing the respective components, and stirring conditions such as a revolution rate of the stirring blade are preferably regulated according to necessary.

A face material (base material) or the cushion layer 10a fed from the roll is transferred on a conveyor 11, and the cell-dispersed urethane composition 8 is continuously discharged from the discharge nozzle of a mixing head 9 onto the face material or the cushion layer 10a. The transferring speed of the face material or cushion layer 10a or the amount of discharge of the cell-dispersed urethane composition 8 may be properly controlled, taking the thickness of the polishing layer 13 into account.

Another face material or a cushion layer 10b is then laminated on the cell-dispersed urethane composition 8. The cell-dispersed urethane composition 8 is cured, while its thickness is controlled to be uniform, so that a polishing layer 13 is formed, which is made of a polyurethane foam. For example, means for controlling the thickness to be uniform may be a roll 12 such as a nip roll or a coater roll. For example, the cell-dispersed urethane composition 8 may be cured by being passed through a heating oven (not shown) provided on the conveyor after controlling its thickness to be uniform. The heating temperature may be from about 40 to about 100° C., and the heating time may be about 5 to about 60 minutes. The steps of allowing the cell-dispersed urethane composition to react until it does not flow, and then heating or post-curing it are effective in improving the physical properties of the polyurethane foam.

The polishing layer 13 formed is then cut parallel to the face into two pieces so that two long polishing layers 15 each composed of a polishing layer 13' and the face material (base material) 10a or 10b are simultaneously formed. In a similar manner, two long laminated sheets 15 each composed of a polishing layer 13' and the cushion layer 10a or 10b are simultaneously formed. For example, the method of cutting the polishing layer 13 into two pieces may include a method of cutting the polishing layer 13 with a cutting blade 14, while transporting the laminate made of the face material 10a, the polishing layer 13 and the face material 10b on the conveyor 11. The cutting may be performed after the polishing layer 13 is preheated so as to have reduced hardness.

When a rough polishing pad is prepared, the polyurethane foam preferably has an average cell diameter of 30 to 80 μm, more preferably 30 to 60 μm. If the cell diameter is without the range, the polishing speed can tend to be low, or the planarity (flatness) of the polished substance (wafer) can tend to be low.

When a final polishing pad is prepared, the polyurethane foam preferably has an average cell diameter of 35 to 300 μm, more preferably of 35 to 100 μm, and particularly preferably of 40 to 80 μm. Out of the range, the polishing rate or durability may tend to be low. The polyurethane foam having an open cell structure can possess an appropriate level of water retention capability.

For example, the resulting long polishing layer or the long laminated sheet 15 is primarily cut into pieces each slightly larger than the desired form (such as a circle, a square, or a rectangle) by means of a cutting machine. When a rough polishing pad is produced, the subsequent steps of post-curing, separating the face material and that the like are carried out to obtain a polishing layer or a laminated polishing sheet. Post-curing may be performed before or after the face material is separated. Generally, since the face material differs from the polishing layer in thermal shrinkage, post-curing is preferably performed after the face material is separated, from a viewpoint of preventing deformation of the polishing layer. On the other hand, when a final polishing pad is produced, the base material is not separated but integrated with the polishing layer to form a polishing sheet. After post-curing, the polishing layer, the polishing sheet in which the polishing layer and the base material are integrated therewith or the laminated polishing sheet is secondarily cut into the desired shape. When a circle is formed by the cutting, its diameter may be from about 50 to about 200 cm, and preferably from 50 to 100 cm. When a square is formed by the cutting, its side may be from about 50 to about 200 cm, and preferably from 50 to 150 cm. When a rectangle is formed by the cutting, its width may be from about 50 to about 200 cm, and preferably from 50 to 100 cm, and its length may be about 1.1 to about 2 times the width. The polishing layer, the polishing sheet in which the polishing layer and the base material are integrated therewith or the laminated polishing sheet is then subjected to the step of forming a projection-and-recess structure on the polishing surface and the like, so that a polishing pad or a laminated polishing pad is obtained.

When a rough polishing pad is prepared, the thickness of the polishing layer 13' is generally, but not limited to, from about 0.8 to 4 mm, preferably 1.2 to 2.5 mm.

When a final polishing pad is prepared, the thickness of the polishing layer 13' is generally, but not limited to, from about 0.2 to 2 mm, preferably from 0.5 to 1.5 mm.

When a rough polishing pad is prepared, the polishing layer 13' has preferably a specific gravity ranging from 0.5 to 1.0. When the specific gravity is less than 0.5, the surface strength of the polishing layer decreases, so that the planarity of the polished substance tends to decrease. When the specific gravity is larger than 1.0, the fine cell number on the surface of the polishing layer decreases, so that the polishing rate tends to decrease despite excellent planarity.

When a final polishing pad is prepared, the specific gravity of the polishing layer 13' is preferably 0.2 to 0.5. When the specific gravity is less than 0.2, the durability of polishing layer tends to be deteriorated. When the specific gravity is greater than 0.5, the crosslink density of the material should be lowered to attain a certain modulus of elasticity. In this case, permanent deformation tends to be increased and durability tends to be deteriorated.

When a rough polishing pad is prepared, the polishing layer 13' has preferably a hardness measured by ASKER D hardness meter, ranging from 45 to 65 degrees. When the ASKER D hardness is less than 45 degrees, the planarity of the polished substance decreases, while when the hardness is more than 65 degrees, the uniformity of the polished substance tends to decrease despite excellent planarity.

When a final polishing pad is prepared, the polishing layer 13' has preferably a hardness measured by ASKER C hardness meter, ranging from 10 to 80 degrees, more preferably 20 to 60 degrees. When the ASKER C hardness is less than 10 degrees, the durability of the polishing layer is reduced, and the planarity of an object of polishing after polishing tends to be deteriorated. When the hardness is greater than 80 degrees, on the other hand, the surface of a material polished is easily scratched.

The range of the thickness of the polishing layer 13' is preferably 100 μm or less. When the range of the thickness is higher than 100 μm, large undulation is caused to generate portions different in a contacting state with an object of polishing, thus adversely influencing polishing characteristics. To solve the range of the thickness of the polishing layer, the surface of the polishing layer is dressed generally in an initial stage of polishing by a dresser having abrasive grains of diamond deposited or fused thereon, but the polishing layer outside of the range described above requires a longer dressing time to reduce the efficiency of production.

The method for reducing range of the thickness of the polishing layer may include buffing the surface of the long polishing layer or the long laminate sheet with a buffing machine. Alternatively, after the long polishing layer or the long laminate sheet is cut into pieces, the range of the thickness of the polishing layer can be reduced by buffing. The buffing is preferably performed in a stepwise manner with abrasive materials different in particle size.

In addition, after the polishing layer 13 formed is cut parallel to the face into two pieces, the surface of the long polishing layer or the long laminated sheet may be sliced again such that variations in the thickness may be reduced.

The method for manufacturing a (laminated) polishing pad according to the second invention is described below. FIGS. 3 to 6 are schematic diagrams showing examples of the process for manufacturing the (laminated) polishing pad according to the second invention.

The cell-dispersed urethane composition 8 is prepared by a similar method as described above.

Figure 4:
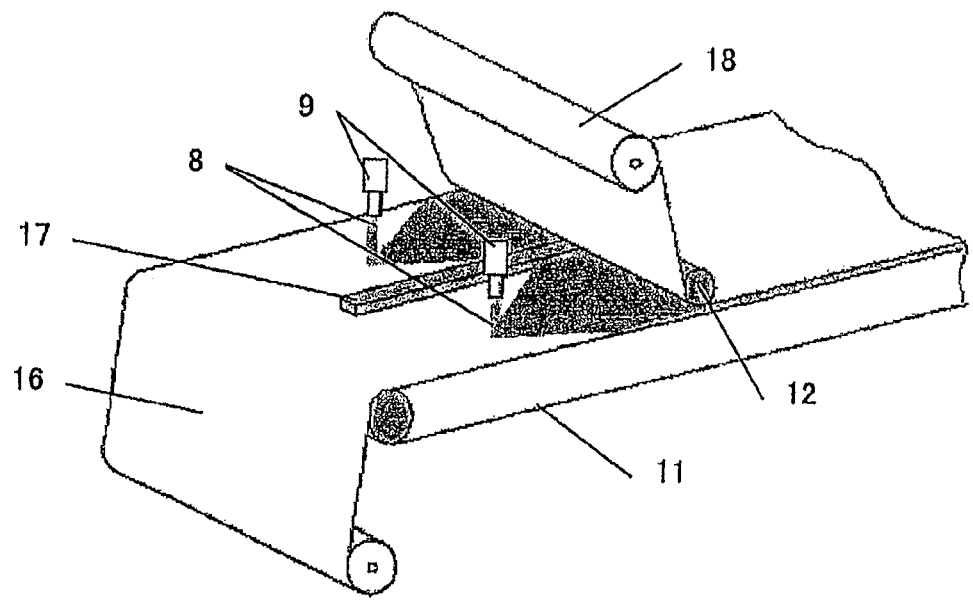
FIG. 4 is a schematic diagram showing another example of a production step of a long laminated polishing layer or a long laminated sheet according to the second invention.
Figure 5:
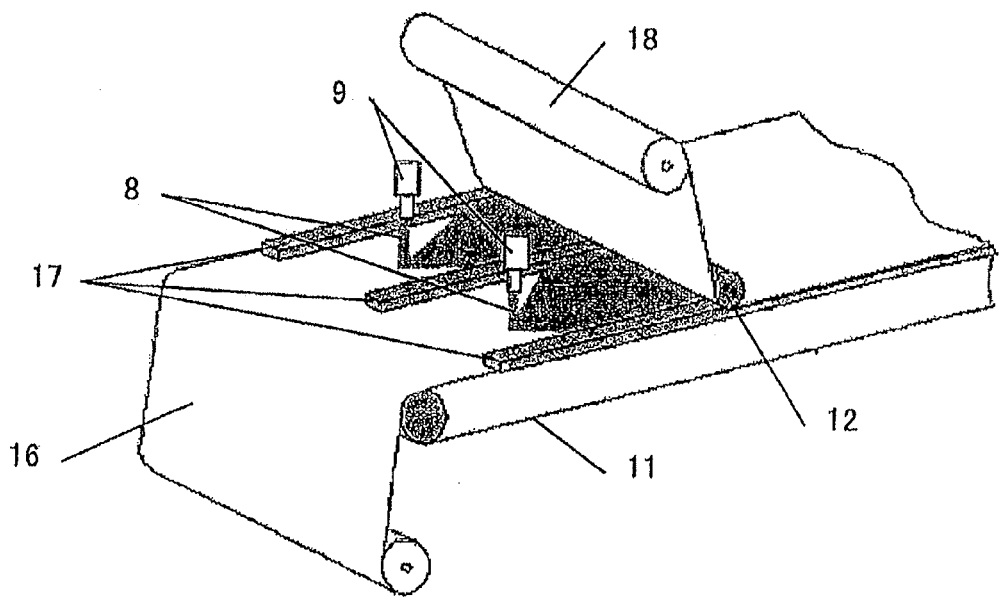
FIG. 5 is a schematic diagram showing another example of a production step of a long laminated polishing layer or a long laminated sheet according to the second invention.
Figure 6:
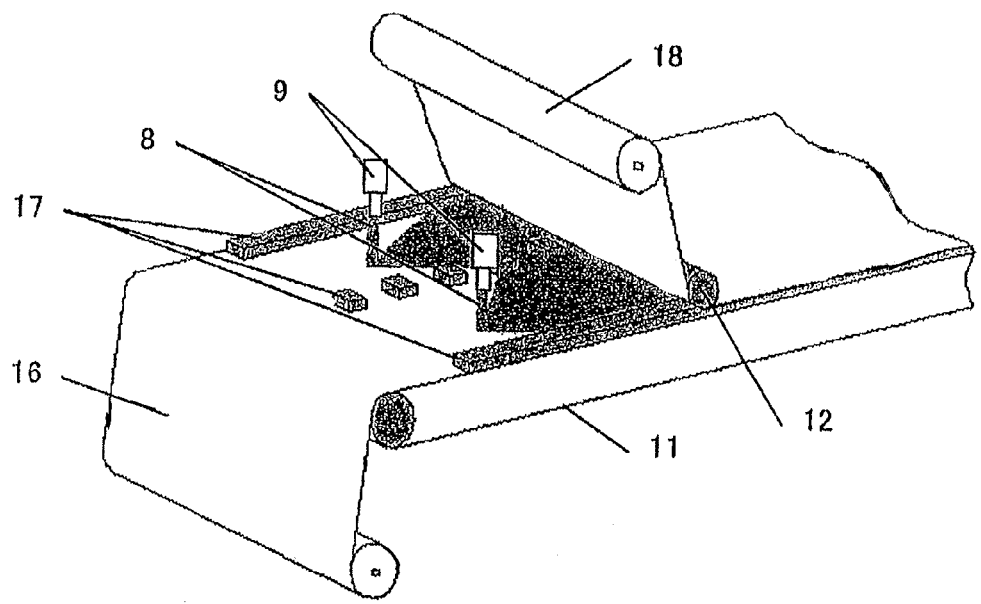
FIG. 6 is a schematic diagram showing another example of a production step of a long laminated polishing layer or a long laminated sheet according to the second invention.

A face material or a cushion layer 16 fed from a roll is transferred on a conveyor 11. A spacer 17 is provided by feeding from a roll or the like so as to be placed on both ends parts and/or on a prescribed inner sites of the face material or the cushion layer 16. An inner spacer 17 may be provided substantially at the center of the face material or the cushion layer 16 as shown in FIG. 4, or two or more of the inner spacers may be provided at prescribed intervals. In view of polishing performance, a too large number of spacers 17 are not preferred, because the area of the polishing region involved in polishing can be relatively small. For example, therefore, when a face material or a cushion layer 16 with a width of about 60 to about 100 cm is used, one to three inner spacers 17 are preferably provided. A plurality of inner spacers 17 are preferably provided at regular intervals. A continuous inner spacer 17 may be provided as shown in FIG. 4, or inner spacers 17 are intermittently provided as shown in FIG. 6. If spacers 17 are intermittently provided, an area of the polishing region involved in polishing can be much larger.

The cell-dispersed urethane composition 8 is then continuously discharged from the discharge nozzle of a mixing head 9 onto the face material or the cushion layer 16 where the spacer 17 is not provided. The transferring speed of the face material or the cushion layer 16 or the amount of discharge of the cell-dispersed urethane composition 8 may be properly controlled, taking the thickness of the polishing layer into account.

A face material 18 is then laminated on the discharged cell-dispersed urethane composition 8, and the cell-dispersed urethane composition 8 is cured, while its thickness is controlled to be uniform, so that a polishing layer made of a polyurethane foam is obtained, and as a result, a long polishing layer or a long laminated sheet is obtained. For example, means for controlling the thickness to be uniform may be a roll 12 such as a nip roll or a coater roll, or a doctor blade. For example, the cell-dispersed urethane composition may be cured by being passed through a heating oven (not shown) provided on the conveyor after controlling its thickness to be uniform. The heating temperature may be from about 40 to about 100° C., and the heating time may be about 5 to about 10 minutes. The steps of allowing the cell-dispersed urethane composition to react until it does not flow, and then heating or post-curing it are effective in improving the physical properties of the polyurethane foam.

The resulting long polishing layer or the long laminated sheet is subjected to the steps of cutting, post-curing, forming a projection-and-recess structure on the polishing surface, and the like, in a similar manner as described above, to obtain a polishing pad or a laminated polishing pad.

The average cell size of the polyurethane foam and the thickness, specific gravity and hardness of the polishing layer, and variations in the thickness may be similar to those described above.

Figure 7:
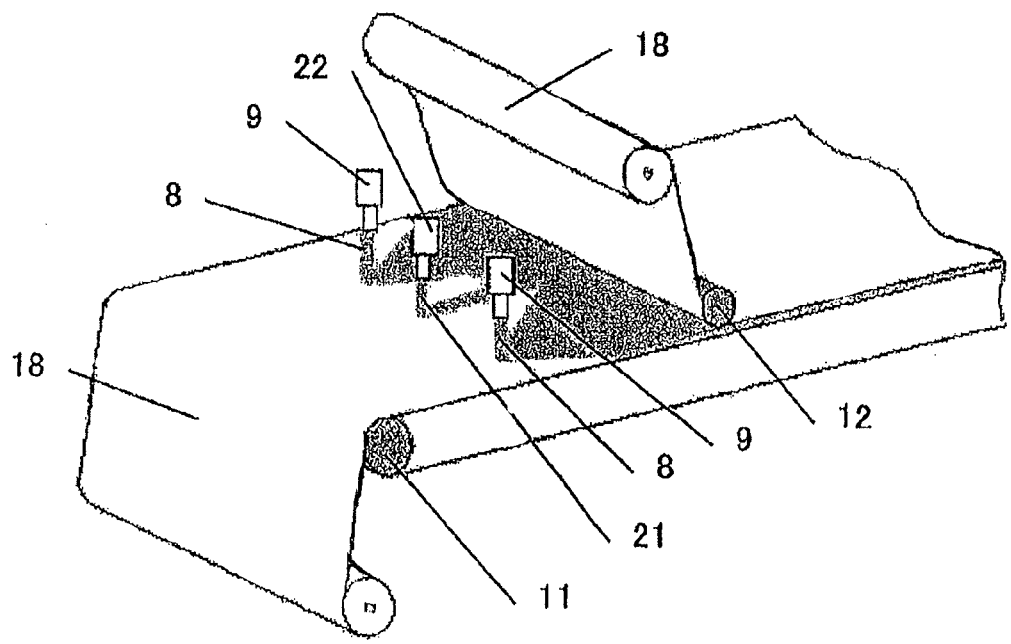
FIG. 7 is a schematic diagram showing a production step of a polishing pad according to the third invention.
Figure 8:
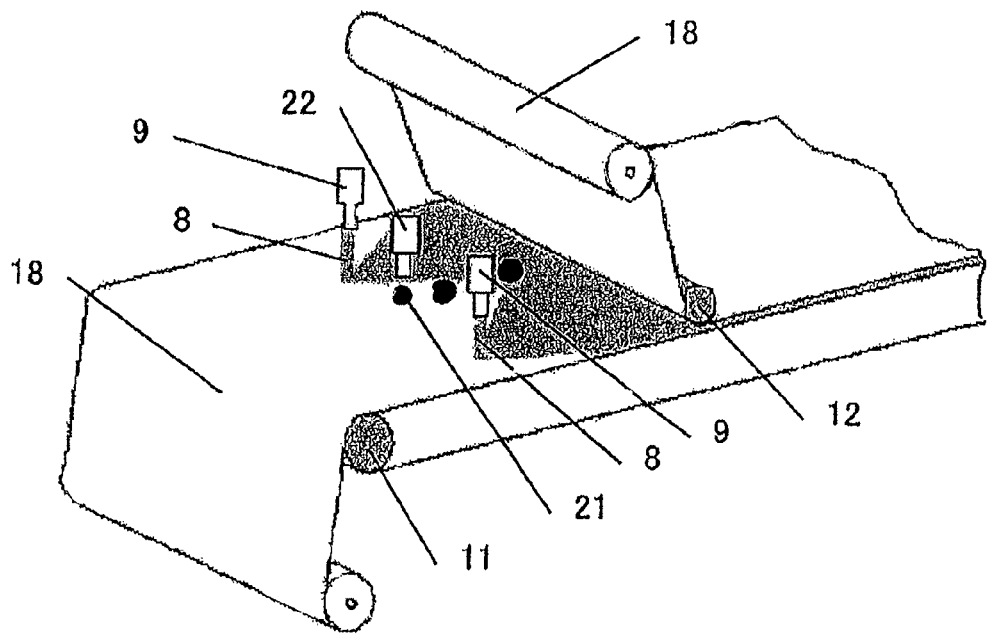
FIG. 8 is a schematic diagram showing another example of a production step of a polishing pad according to the third invention.
Figure 9:
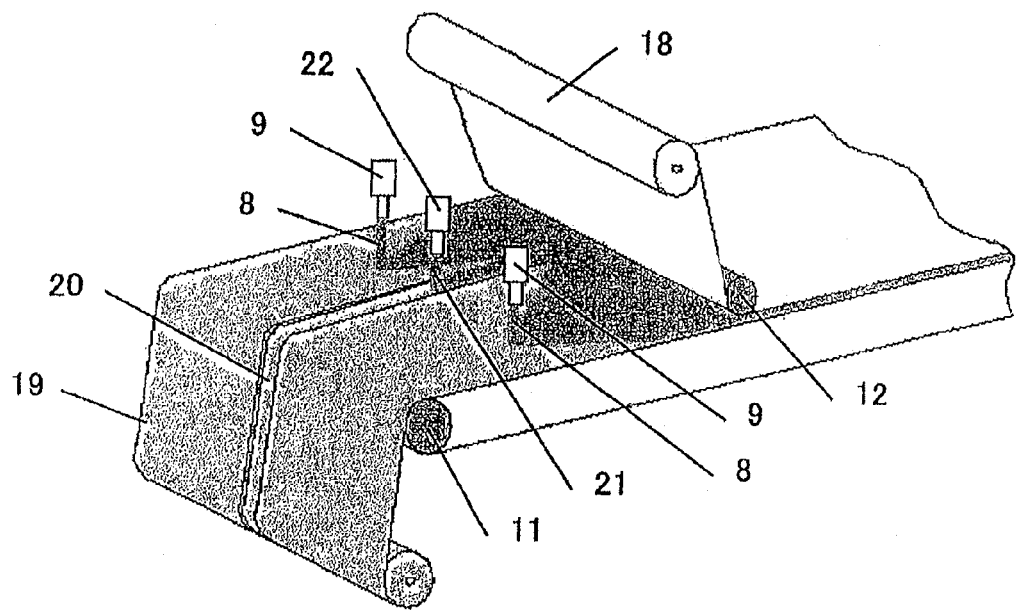
FIG. 9 is a schematic diagram showing a production step of a laminated polishing pad according to the third invention.
Figure 10:
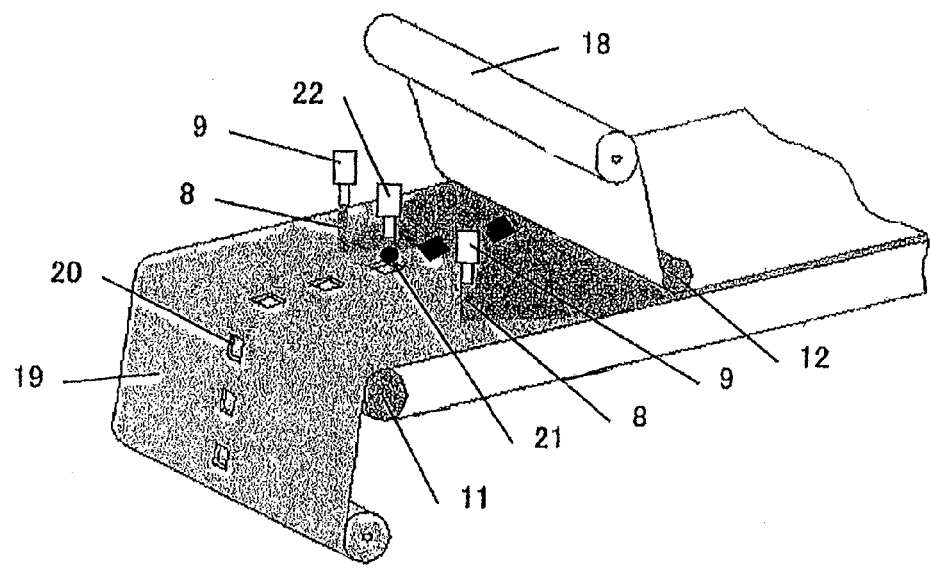
FIG. 10 is a schematic diagram showing another example of a production step of a laminated polishing pad according to the third invention.

The method for manufacturing a (laminated) polishing pad according to the third invention is described below. FIGS. 7 and 8 are schematic diagrams showing examples of the process for manufacturing the polishing pad according to the third invention. FIGS. 9 and 10 are schematic diagrams showing examples of the process for manufacturing the laminated polishing pad according to the third invention.

The cell-dispersed urethane composition 8 is prepared by a similar method as described above.

A face material 18 or a cushion layer 19 fed from a roll is transferred on a conveyor 11. The cushion layer 19 has a continuous through hole 20 for forming a light transmitting region or has intermittently provided through holes 20 for forming a light transmitting region. The width of the through hole 20 is generally, but not limited to, from about 0.5 to about 2 cm, and preferably about 0.6 to about 1.5 cm. When through holes 20 are intermittently provided, the length of each through hole 20 is from about 1 to about 10 cm, and preferably from about 3 to about 8 cm. Examples of the shape of the through hole include, but are not limited to, rectangle, polygon, circle, ellipse and the like. Two or more lines of through holes 20 may be formed on the cushion layer 19.

As shown in FIGS. 7 and 8, a light transmitting region-forming material 21 is continuously or intermittently discharged from a nozzle of a discharge head 22 onto the face material 18. At the same time or slightly later, the cell-dispersed urethane composition 8 is continuously discharged from a discharge nozzle of a mixing head 9 onto the face material 18. The transferring speed of the face material 18 or the amount of discharge of the light transmitting region-forming material 21 or the cell-dispersed urethane composition 8 may be properly controlled, taking into account the thickness and the area of the light transmitting region and the thickness of the polishing region. At the time of discharging, the light transmitting region-forming material 21 preferably has a viscosity of 1 to 30 Pa·s, and more preferably of 2 to 20 Pa·s. At the time of discharging, the cell-dispersed urethane composition 8 preferably has a viscosity of 1 to 20 Pa·s, and more preferably of 2 to 10 Pa·s.

On the other hand, as shown in FIGS. 9 and 10, the light transmitting region-forming material 21 is continuously or intermittently discharged from the nozzle of the discharge head 22 so as to be deposited in and on the through hole 20 provided in the cushion layer 19. At the same time or slightly later, the cell-dispersed urethane composition 8 is continuously discharged from the discharge nozzle of the mixing head 9 onto the cushion layer 19. The transferring speed of the cushion layer 19 or the amount of discharge of the light transmitting region-forming material 21 or the cell-dispersed urethane composition 8 may be properly controlled, taking into account the thickness and the area of the light transmitting region and the thickness of the polishing region. At the time of discharging, the light transmitting region-forming material 21 preferably has a viscosity of 1 to 30 Pa·s, and more preferably of 2 to 20 Pa·s. At the time of discharging, the cell-dispersed urethane composition 8 preferably has a viscosity of 1 to 20 Pa·s, and more preferably of 2 to 10 Pa·s.

A face material 18 is then laminated on the light transmitting region-forming material 21 and the cell-dispersed urethane composition 8. The light transmitting region-forming material 21 and the cell-dispersed urethane composition 8 are cured, while their thickness is controlled to be uniform, so that a long polishing layer in which the light transmitting region and the polishing region are integrated therewith or a long laminated sheet is obtained. For example, means for controlling the thickness to be uniform may be a roll 12 such as a nip roll or a coater roll. For example, the light transmitting region-forming material 21 and the cell-dispersed urethane composition 8 may be cured by being passed through a heating oven (not shown) provided on the conveyor after controlling its thickness to be uniform. The heating temperature may be from about 40 to about 100° C., and the heating time may be about 5 to about 10 minutes. The steps of allowing the cell-dispersed urethane composition to react until it does not flow, and then heating or post-curing it are effective in improving the physical properties of the polyurethane foam. When the light transmitting-forming material is a thermoplastic resin, the light transmitting region-forming material should be cured by cooling it after the cell-dispersed urethane composition is cured by heating. When the light transmitting region-forming material is a photo-curable resin, it should be cured by irradiation with light such as ultraviolet light or an electron beam. The light transmitting region should contain bubbles as little as possible from a viewpoint of enhancing light transmittance.

The resulting long polishing layer or the long laminated sheet is subjected to the steps of cutting, post-curing, forming a projection-and-recess structure on the polishing surface, and the like, in a similar manner as described above, to obtain a polishing pad or a laminated polishing pad.

The average cell diameter of the polyurethane foam and the thickness, specific gravity and hardness of the polishing layer, and variations in the thickness may be similar to those described above.

Figure 11:
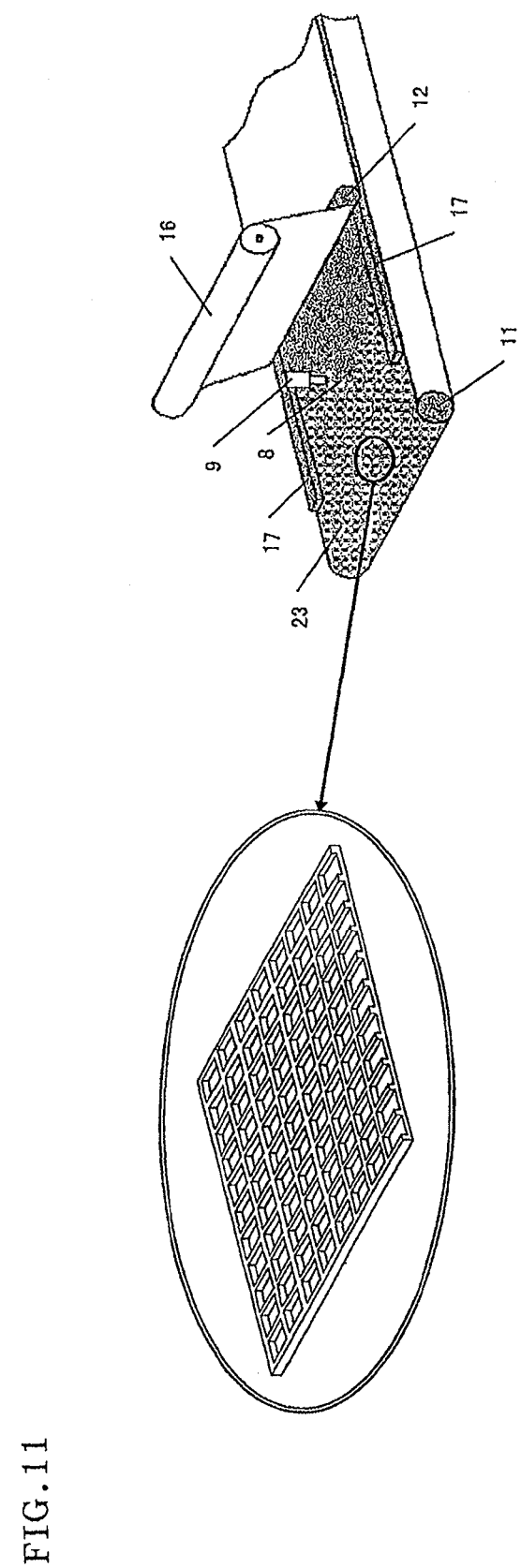
FIG. 11 is a schematic diagram showing a production step of a groove-carrying (laminated) polishing pad according to the fourth invention.
Figure 12:
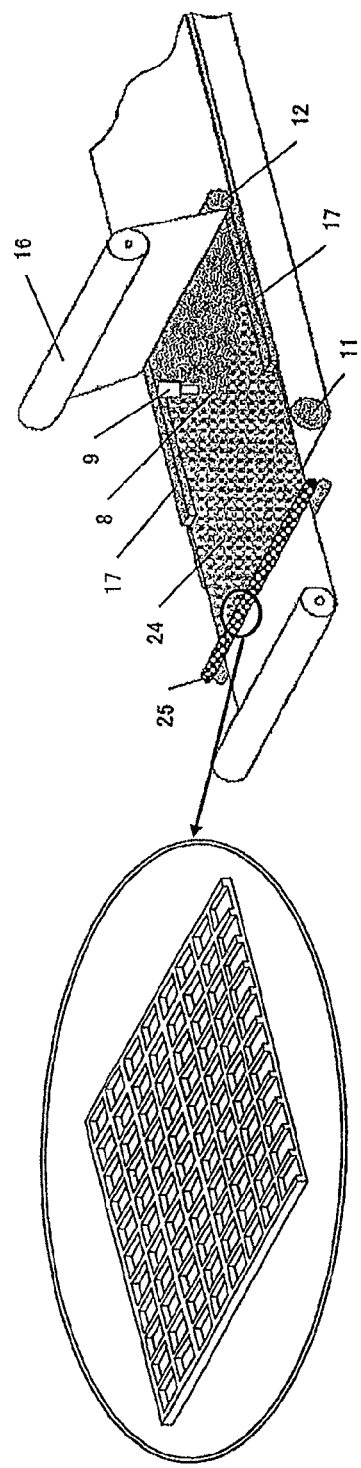
FIG. 12 is a schematic diagram showing another example of a production step of a groove-carrying (laminated) polishing pad according to the fourth invention.

The method for manufacturing a groove-carrying (laminated) polishing pad according to the fourth invention is described below. FIG. 11 is a schematic diagram showing a process for manufacturing a groove-carrying (laminated) polishing pad by use of a conveyor belt. FIG. 12 is a schematic diagram showing a process for manufacturing a groove-carrying (laminated) polishing pad by use of a release sheet.

The cell-dispersed urethane composition 8 is prepared by a similar method as described above.

Referring to FIG. 11, a conveyor belt 23 rotationally transfers on a conveyor 11. At first, the cell-dispersed urethane composition 8 is continuously discharged from the discharge nozzle of the mixing head 9 onto the conveyor belt 23. The transferring speed of the conveyor belt 23 and the amount of discharge of the cell-dispersed urethane composition 8 may be properly controlled, taking the thickness of the polishing layer into account.

Spacers 17 are preferably provided on both ends parts of the conveyor belt 23 before the cell-dispersed urethane composition 8 is discharged onto the conveyor belt 23, so that the cell-dispersed urethane composition 8 can be prevented from dripping out and that the accuracy of the thickness of the polishing layer can be improved. Examples of a raw material of the spacer include a thermoplastic resin such as a polyurethane resin, a polyester resin, a polyamide resin, a cellulose-based resin, an acrylic resin, a polycarbonate resin, a halogenated resin, polystyrene, and an olefin-based resin (such as polyethylene and polypropylene); rubber such as natural rubber, isoprene rubber, butadiene rubber, chloroprene rubber, styrene-butadiene rubber, reclaimed rubber, and polyisobutylene rubber; a silicone resin such as dimethylpolysiloxane and diphenylpolysiloxane and the like.

A face material or a cushion layer 16 is then laminated on the discharged cell-dispersed urethane composition 8, and the cell-dispersed urethane composition 8 is cured, while its thickness is controlled to be uniform, so that a groove-carrying long polishing layer made of a polyurethane foam or a groove-carrying long laminated sheet having the groove-carrying long polishing layer is obtained. For example, means for controlling the thickness to be uniform may be a roll 12 such as a nip roll or a coater roll, or a doctor blade. For example, the cell-dispersed urethane composition may be cured by being passed through a heating oven (not shown) provided on the conveyor after controlling its thickness to be uniform. The heating temperature may be from about 40 to about 100° C., and the heating time may be about 5 to about 10 minutes. The steps of allowing the cell-dispersed urethane composition to react until it does not flow, and then heating or post-curing it are effective in improving the physical properties of the polyurethane foam.

On the other hand, referring to FIG. 12, a release sheet 24 transfers on the conveyor 11. A release sheet 24 having previously formed recessed structures may be used, or recessed structures may be formed on a release sheet 24 by means of a pattern roll 25, while the sheet 24 is fed on the conveyor. The other features are formed by a similar method as described above so that a groove-carrying long polishing layer or a groove-carrying long laminated sheet is obtained.

The resulting groove-carrying long polishing layer or the long laminated sheet is then separated from the conveyor belt and subjected to cutting, post-curing and the like in a similar manner as described above to obtain a groove-carrying polishing pad or a groove-carrying laminated polishing pad.

On the other hand, when the release sheet is used, the resulting groove-carrying long polishing layer or the long laminated sheet is separated from the release sheet and then subjected to cutting, post-curing and the like in a similar manner as described above to obtain a groove-carrying (laminated) polishing pad.

The average cell size of the polyurethane foam and the thickness, specific gravity and hardness of the polishing layer, and variations in the thickness may be similar to those described above.

In the fourth aspect of the invention, the polishing surface of the groove-carrying (laminated) polishing pad, which is brought into contact with a substance to be polished, has grooves for holding and replacing a slurry. The polishing surface of the polishing layer made of a foam has a lot of openings which function to hold and replace a slurry. If grooves are formed on the polishing surface, a slurry can be more efficiently held and replaced so that the destruction of the substance to be polished caused by adsorption of the slurry on the substance can be prevented. For example, the grooves include XY lattice grooves, concentric grooves, polygonal columns, cylindrical columns, spiral grooves, eccentric grooves, radial grooves, or any combination thereof.

In the first to third aspect of the invention, the polishing surface of the polishing pad, which is brought into contact with a substance to be polished, preferably has projections and recesses for holding and replacing a slurry. The polishing surface of the polishing layer made of a foam has a lot of openings which function to hold and replace a slurry. If projections and recesses are formed on the polishing surface, a slurry can be more efficiently held and replaced so that the destruction of the substance to be polished caused by adsorption of the slurry on the substance can be prevented. The projections and recesses may be not limited, as long as they can serve to hold and replace a slurry. For example, the projections and recesses include XY lattice grooves, concentric grooves, through holes, non-through holes, polygonal columns, cylindrical columns, spiral grooves, eccentric grooves, radial grooves, or any combination thereof. In general, the projections and recesses are regularly formed. However, the groove pitch, the groove width, the groove depth, and the like may be changed per every certain range in order to hold and replace a slurry in a desired manner.

The method of forming the projection and recess structure is not particularly limited, and for example, formation by mechanical cutting with a jig such as a bite of predetermined size, formation by casting and curing resin in a mold having a specific surface shape, formation by pressing resin with a pressing plate having a specific surface shape, formation by photolithography, formation by a printing means, and formation by a laser light using a $CO_2$ gas laser or the like.

In the first to fourth invention, the (laminated) polishing pad may further include a double-sided adhesive tape that is provided on the surface of the polishing layer, the base material or the cushion layer to be bonded to a platen. When a single-sided adhesive tape is used as the face material, it is not necessary to additionally provide a double-sided adhesive tape, because an adhesive layer is already provided on the base material to be bonded to a platen. As the double sided tape, a tape of a common construction can be used in which adhesive layers are, as described above, provided on both surfaces of a substrate. As the substrate, for example, a nonwoven fabric or a film is used. Preferably used is a film as a substrate since separation from the platen is necessary after the use of a (laminated) polishing pad. As a composition of an adhesive layer, for example, a rubber-based adhesive or an acrylic-based adhesive is exemplified. Preferable is an acrylic-based adhesive because of less of metal ions in content to which consideration is given.

A semiconductor device is fabricated after operation in a step of polishing a surface of a semiconductor wafer with a (laminated) polishing pad. The term, a semiconductor wafer, generally means a silicon wafer on which a wiring metal and an oxide layer are stacked. No specific limitation is imposed on a polishing method of a semiconductor wafer or a polishing apparatus, and polishing is performed with a polishing apparatus equipped, as shown in FIG. 1, with a polishing platen 2 supporting a (laminated) polishing pad 1, a polishing head 5 holding a semiconductor wafer 4, a backing material for applying a uniform pressure against the wafer and a supply mechanism of a polishing agent 3. The (laminated) polishing pad 1 is mounted on the polishing platen 2 by adhering the pad to the platen with a double sided tape. The polishing platen 2 and the polishing head 5 are disposed so that the (laminated) polishing pad 1 and the semiconductor wafer 4 supported or held by them oppositely face each other and provided with respective rotary shafts 6 and 7. A pressure mechanism for pressing the semiconductor wafer 4 to the (laminated) polishing pad 1 is installed on the polishing head 5 side. During polishing, the semiconductor wafer 4 is polished by being pressed against the (laminated) polishing pad 1 while the polishing platen 2 and the polishing head 5 are rotated and a slurry is fed. No specific limitation is placed on a flow rate of the slurry, a polishing load, a polishing platen rotation number and a wafer rotation number, which are properly adjusted.

Protrusions on the surface of the semiconductor wafer 4 are thereby removed and polished flatly. Thereafter, a semiconductor device is produced therefrom through dicing, bonding, packaging etc. The semiconductor device is used in an arithmetic processor, a memory etc.

EXAMPLES

Description will be given of the invention with examples, while the invention is not limited to description in the examples.

First Invention

Preparation Example 1

32 parts by weight of toluene diisocyanate (a mixture of 2,4-diisocyanate/2,6-diisocyanate=80/20), 8 parts by weight of 4,4'-dicyclohexylmethane diisocyanate, 54 parts by weight of polytetramethylene glycol (number average molecular weight: 1006), and 6 parts by weight of diethylene glycol were mixed, and stirred and heated at 80° C. for 120 minutes so that an isocyanate-terminated prepolymer (2.1 meq/g in isocyanate equivalent) was prepared. 100 parts by weight of the isocyanate-terminated prepolymer and 3 parts by weight of a silicone surfactant (SH-192, manufactured by Dow Corning Toray Co., Ltd.) were mixed to prepare a mixture A which was controlled to have a temperature of 80° C. In a mixing chamber, 80 parts by weight of the mixture A and 20 parts by weigh of 4,4'-methylenebis(o-chloroaniline) (Iharacuamine MT, manufactured by Ihara Chemical Industry Co., Ltd.) melted at 120° C. were mixed, and at the same time, air was dispersed into the mixture by mechanical stirring so that a cell-dispersed urethane composition A was prepared.

Example 1

While a release-treated face material (thickness: 188 μm, width: 100 cm) made of a PET film was fed, the cell-dispersed urethane composition A was continuously discharged onto the face material. The cell-dispersed urethane composition A was then covered with another release-treated face material (thickness: 188 μm, width: 100 cm) made of a PET film, and the thickness was controlled to be uniform by means of a nip roll. The composition was then cured by heating to 80° C. so that a polishing layer made of a closed cell structured polyurethane foam was formed, and as a result, a laminate was obtained. The polishing layer of the resulting laminate was cut parallel to the face into two pieces with a band saw type cutting machine (G1, manufactured by Fecken) so that two long polishing layers each composed of the polishing layer (thickness: 1.5 mm) and the face material were simultaneously obtained. The long polishing layer was primarily cut into 80 cm square pieces, and then the face material was separated. The resulting piece was post-cured at 80° C. for 6 hours and secondarily cut into a 70 cm diameter polishing layer. The surface of the polishing layer was then buffed with a buffing machine (manufactured by AMITEC Corporation) to have a thickness of 1.27 mm that is accurately controlled. The polishing layer surface was then grooved using a grooving machine (manufactured by Toho Koki Co., Ltd.), and a cushion layer was placed on its back side, so that a laminated polishing pad was obtained.

Example 2

While a cushion layer (width: 90 cm) made of a polyethylene foam (Toraypef, manufactured by Toray Industries, Inc.) with its surface buffed and its thickness controlled to 0.8 mm was fed, the cell-dispersed urethane composition A was continuously discharged onto the cushion layer. The cell-dispersed urethane composition A was then covered with another cushion layer (width: 90 cm), and the thickness was controlled to be uniform by means of a nip roll. The composition was then cured by heating to 80° C. so that a polishing layer made of a closed cell structured polyurethane foam was formed, and as a result, a laminate was obtained. The polishing layer of the resulting laminate was cut parallel to the face into two pieces with a band saw type cutting machine (G1, manufactured by Fecken) so that two long laminated sheets each composed of the polishing layer (thickness: 1.5 mm) and the cushion layer were simultaneously obtained. The long laminated sheet was primarily cut into 80 cm square pieces, and then each piece was post-cured at 80° C. for 6 hours and secondarily cut into a 70 cm diameter laminated polishing sheet. The surface of the polishing sheet was then buffed with a buffing machine (manufactured by AMITEC Corporation) to have a thickness of 1.27 mm that is accurately controlled. The polishing surface of the laminated polishing sheet was then grooved using a grooving machine (manufactured by Toho Koki Co., Ltd.) so that a laminated polishing pad was obtained.

Preparation Example 2

To a vessel were added 45 parts by weight of POP36/28 (polymer polyol, 28 mg KOH/g in hydroxyl value, manufactured by Mitsui Chemicals, Inc.), 40 parts by weight of ED-37A (polyether polyol, 38 mg KOH/g in hydroxyl value, manufactured by Mitsui Chemicals, Inc.), 10 parts by weight of PCL305 (polyester polyol, 305 mg KOH/g in hydroxyl value, manufactured by Daisel Chemical Industries, Ltd.), 5 parts by weight of diethylene glycol, 5.5 parts by weight of a silicone surfactant (SH-192, manufactured by Dow Corning Toray Co., Ltd.), and 0.25 parts by weight of a catalyst (No. 25, manufactured by Kao Corporation) and mixed. The reaction system was vigorously stirred for about 4 minutes with a stirring blade at a rotational speed of 900 rpm such that air bubbles were incorporated into the reaction system. Thereafter, 31.57 parts by weight of Millionate MTL (manufactured by Nippon Polyurethane Industry Co., Ltd.) was added, and the mixture was stirred for about 1 minute to give a cell-dispersed urethane composition B.

Example 3

While a base material (Toyobo Ester E5001, polyethylene terephthalate, thickness: 0.188 mm, width: 100 cm) manufacture by Toyobo Co., Ltd.) was fed, the cell-dispersed urethane composition B was continuously discharged onto the base material. The cell-dispersed urethane composition B was then covered with another piece of the base material, and the thickness was controlled to be uniform by means of a nip roll. The composition was then cured by heating to 70° C. so that a polishing layer made of an open cell structured polyurethane foam was formed, and as a result, a laminate was obtained. The polishing layer of the resulting laminate was cut parallel to the face into two pieces with a band saw type cutting machine (G1, manufactured by Fecken) so that two long polishing layers each composed of the polishing layer (thickness: 1.2 mm) and the base material were simultaneously obtained. The long polishing layer was then primarily cut into 80 cm square pieces, and then each piece was post-cured at 70° C. for 6 hours and secondarily cut into a 70 cm diameter polishing sheet. The surface of the polishing sheet was then buffed with a buffing machine (manufactured by AMITEC Corporation) to have a thickness of 1.0 mm that is accurately controlled. The polishing surface of the polishing sheet was then grooved using a grooving machine (manufactured by Toho Koki Co., Ltd.) so that a polishing pad was obtained.

Example 4

A polishing pad was prepared using the process of Example 3, except that a single-sided adhesive tape composed of a polyethylene terephthalate (thickness: 0.188 mm, width: 100 cm) and an acrylic adhesive layer placed on one side thereof was used in place of the base material (Toyobo Ester E5001).

Second Invention

Preparation Example 32 parts by weight of toluene diisocyanate (a mixture of 2,4-diisocyanate/2,6-diisocyanate=80/20), 8 parts by weight of 4,4'-dicyclohexylmethane diisocyanate, 54 parts by weight of polytetramethylene glycol (number average molecular weight: 1006), and 6 parts by weight of diethylene glycol were mixed, and stirred and heated at 80° C. for 120 minutes so that an isocyanate-terminated prepolymer (2.1 meq/g in isocyanate equivalent) was prepared. 100 parts by weight of the isocyanate-terminated prepolymer and 3 parts by weight of a silicone surfactant (SH-192, manufactured by Dow Corning Toray Co., Ltd.) were mixed to prepare a mixture A which was controlled to have a temperature of 80° C. In a mixing chamber, 80 parts by weight of the mixture A and 20 parts by weigh of 4,4'-methylenebis(o-chloroaniline) (Iharacuamine MT, manufactured by Ihara Chemical Industry Co., Ltd.) melted at 120° C. were mixed, and at the same time, air was dispersed into the mixture by mechanical stirring so that a cell-dispersed urethane composition was prepared.

Example 1

TPU (Miractran E498, manufactured by Nippon Miractran Co., Ltd.) was extruded to produce cord-shaped spacers A with a width of 6 mm and a thickness of 2 mm. The light transmittance of the resulting spacer A was measured with a spectrophotometer (Spectrophotometer U-3210, manufactured by Hitachi Ltd.) in the wavelength range of 400 to 700 nm. As a result, the light transmittance was 50% or more throughout the range.

While a face material (thickness: 50 nm, width: 100 cm) made of polyethylene terephthalate (PET) was fed, the spacers A were provided on both ends parts and the center of the face material. The cell-dispersed urethane composition was then continuously discharged onto the spacer A-free part of the face material. The cell-dispersed urethane composition was then covered with another face material (thickness: 50 nm, width: 100 cm) made of PET, and the thickness was controlled to be uniform by means of a nip roll. The composition was then cured by heating to 80° C. so that a long polishing layer made of a polyurethane foam was formed. The long polishing layer was primarily cut into 80 cm square pieces, and then both face materials were separated. The resulting piece was post-cured at 80° C. for 6 hours and secondarily cut into a 70 cm diameter polishing layer. The surface of the polishing layer was then buffed with a buffing machine (manufactured by AMITEC Corporation) so that the thickness accuracy was adjusted. The polishing layer surface was then grooved using a grooving machine (manufactured by Toho Koki Co., Ltd.), and a cushion layer was laminated on its back side, so that a polishing pad was obtained.

Example 2

TPU (Miractran E498, manufactured by Nippon Miractran Co., Ltd.) was extruded to prepare a cord-shaped spacer B with a width of 6 mm and a thickness of 2.8 mm. The light transmittance of the resulting spacer B was measured with a spectrophotometer (Spectrophotometer U-3210, manufactured by Hitachi Ltd.) in the wavelength range of 400 to 700 nm. As a result, the light transmittance was 50% or more over the range.

While a cushion layer (width: 90 cm) made of a polyethylene foam (Toraypef, manufactured by Toray Industries, Inc.) with its surface buffed and its thickness controlled to 0.8 mm and having a 6 mm-wide through hole at its center was fed, the spacers A were provided on both ends parts of the cushion layer, and the spacer B was provided in the through hole. The cell-dispersed urethane composition was then continuously discharged onto the part of the cushion layer where the spacer is not provided. The cell-dispersed urethane composition was then covered with a face material (thickness: 50 nm, width: 90 cm) made of PET, and the thickness was controlled to be uniform by means of a nip roll. The composition was then cured by heating to 80° C. so that a polishing layer made of a polyurethane foam was formed, and as a result, a long laminated sheet was obtained. The long laminated sheet was primarily cut into 80 cm square pieces, and then the face material was separated. The resulting piece was post-cured at 80° C. for 6 hours and secondarily cut into a 70 cm diameter laminated polishing sheet. The surface of the polishing sheet was then buffed with a buffing machine (manufactured by AMITEC Corporation) so that the thickness accuracy was adjusted. The polishing layer surface of the laminated polishing sheet was then grooved using a grooving machine (manufactured by Toho Koki Co., Ltd.) so that a laminated polishing pad was obtained.

Example 3

A cell-dispersed urethane composition was prepared by a similar method in the Preparation Example. While a release-treated face material made of a PET film was fed, the cell-dispersed urethane composition was continuously discharged onto the face material. The cell-dispersed urethane composition was covered with another release-treated face material made of a PET film, and the thickness was controlled to be uniform by means of a nip roll. The composition was then cured by heating to 80° C., resulting in a polyurethane foam sheet. The polyurethane foam sheet was separated from the face material and post-cured at 80° C. for 6 hours. The polyurethane foam sheet was then cut to produce cord-shaped spacers C with a width of 6 mm and a thickness of 2 mm.

While a cushion layer (width: 90 cm) made of a polyethylene foam (Toraypef, manufactured by Toray Industries, Inc.) with its surface buffed and its thickness controlled to 0.8 mm was fed, the spacers C were provided on both ends parts and the center of the cushion layer. The cell-dispersed urethane composition was then continuously discharged onto the part of the cushion layer where the spacer is not provided. The cell-dispersed urethane composition was then covered with a face material (thickness: 50 nm, width: 90 cm) made of PET, and the thickness was controlled to be uniform by means of a nip roll. The composition was then cured by heating to 80° C. so that a polishing layer made of a polyurethane foam was formed, and as a result, a long laminated sheet was obtained. The long laminated sheet was primarily cut into 80 cm square pieces, and then the face material was separated. The resulting piece was post-cured at 80° C. for 6 hours and secondarily cut into a 70 cm-diameter laminated polishing sheet. The surface of the polishing sheet was then buffed with a buffing machine (manufactured by AMITEC Corporation) so that the thickness accuracy was adjusted. The polishing layer surface of the laminated polishing sheet was then grooved using a grooving machine (manufactured by Toho Koki Co., Ltd.) so that a laminated polishing pad was obtained.

Example 4

TPU (Miractran E498, manufactured by Nippon Miractran Co., Ltd.) was extruded to produce a first cord-shaped spacer with a width of 6 mm and a thickness of 0.5 mm. Thereafter, TPU with a width of 6 mm and a thickness of 0.5 mm was sequentially laminated on the first spacer by extrusion so that a cord-shaped laminated spacer D (width: 6 mm, thickness: 2 mm, length: 10 cm) was obtained, which was composed of four peelable TPU sheet layers.

While a face material (thickness: 50 nm, width: 100 cm) made of PET was fed, the laminated spacers D were provided on both ends parts of the face material and on the face material at intervals of 20 cm in each of the width direction and the feeding direction (wherein the long side of the spacer was provided parallel to the feeding direction). The cell-dispersed urethane composition was then continuously discharged onto the spacer D-free part of the face material. The cell-dispersed urethane composition was then covered with another face material (thickness: 50 nm, width: 100 cm) made of PET, and the thickness was controlled to be uniform by means of a nip roll. The composition was then cured by heating to 80° C. so that a long polishing layer made of a polyurethane foam was obtained. The long polishing layer was primarily cut into 80 cm square pieces, and then both face materials were separated. The resulting piece was post-cured at 80° C. for 6 hours and secondarily cut into a 70 cm diameter polishing layer. The polishing layer surface was then buffed with a buffing machine (manufactured by AMITEC Corporation) so that the thickness accuracy was adjusted. A single layer of the TPU sheet on the polishing surface side was peeled off from the laminated spacer D so that a 0.5 mm deep groove was formed. A cushion layer was laminated on the back side of the polishing layer so that a polishing pad was obtained.

Example 5

TPU (Miractran E498, manufactured by Nippon Miractran Co., Ltd.) was extruded to produce a cord-shaped spacer with a width of 6 mm and a thickness of 2.8 mm. The spacer was then cut to produce 10 cm long spacers E (width: 6 mm, thickness: 2.8 mm, length: 10 cm).

While a cushion layer (width: 90 cm) was fed that was made of a polyethylene foam (Toraypef, manufactured by Toray Industries, Inc.) with its surface buffed and its thickness controlled to 0.8 mm and had a 6 mm-wide, 10 cm-long (feeding direction) through holes at its center at intervals of 20 cm in the feeding direction, the spacers A were provided on both ends parts of the cushion layer, and the spacers E were provided in the through holes. The cell-dispersed urethane composition was then continuously discharged onto the part of the cushion layer where the spacer is not provided. The cell-dispersed urethane composition was then covered with a face material (thickness: 50 nm, width: 90 cm) made of PET, and the thickness was controlled to be uniform by means of a nip roll. The composition was then cured by heating to 80° C.

so that a polishing layer made of a polyurethane foam was formed, and as a result, a long laminated sheet was obtained. The long laminated sheet was primarily cut into 80 cm square pieces, and then the face material was separated. The resulting piece was post-cured at 80° C. for 6 hours and secondarily cut into a 70 cm diameter laminated polishing sheet. The surface of the polishing sheet was then buffed with a buffing machine (manufactured by AMITEC Corporation) so that the thickness accuracy was adjusted. The polishing layer surface of the laminated polishing sheet was then grooved using a grooving machine (manufactured by Toho Koki Co., Ltd.) so that a laminated polishing pad was obtained.

Example 6

TPU (Miractran E498, manufactured by Nippon Miractran Co., Ltd.) was extruded to produce a first cord-shaped spacer with a width of 6 mm and a thickness of 0.7 mm. Thereafter, TPU with a width of 6 mm and a thickness of 0.7 mm was sequentially laminated on the first spacer by extrusion so that a cord-shaped laminated spacer F (width: 6 mm, thickness: 2.8 mm, length: 10 cm) was obtained, which was composed of four peelable TPU sheet layers.

While a cushion layer (width: 90 cm) was fed that was made of a polyethylene foam (Toraypef, manufactured by Toray Industries, Inc.) with its surface buffed and its thickness controlled to 0.8 mm and had a 6 mm-wide, 10 cm-long (feeding direction) through holes at its center at intervals of 20 cm in the feeding direction, the spacers A were placed on both ends parts of the cushion layer, and the spacers F were provided in the through holes. The cell-dispersed urethane composition was then continuously discharged onto the part of the cushion layer where the spacer is not provided. The cell-dispersed urethane composition was then covered with a face material (thickness: 50 nm, width: 90 cm) made of PET, and the thickness was controlled to be uniform by means of a nip roll. The composition was then cured by heating to 80° C. so that a polishing layer made of a polyurethane foam was formed, and as a result, a long laminated sheet was obtained. The long laminated sheet was primarily cut into 80 cm square pieces, and then the face material was separated. The resulting piece was post-cured at 80° C. for 6 hours and secondarily cut into a 70 cm diameter laminated polishing sheet. The surface of the polishing sheet was then buffed with a buffing machine (manufactured by AMITEC Corporation) so that the thickness accuracy was adjusted. The polishing layer surface of the polishing sheet was then grooved using a grooving machine (manufactured by Toho Koki Co., Ltd.), and a single layer of the TPU sheet on the back side of the polishing sheet was peeled off from the laminated spacer F so that a 0.7 mm deep groove was formed. As a result, a laminated polishing pad was obtained.

Third Invention (Measurement of Viscosity of Cell-Dispersed Urethane Composition and Light Transmitting Region-Forming Material)

Viscosity of each of the prepared cell-dispersed urethane composition and a light transmitting region-forming material was measured according to JIS K 7117-1. The measuring device used was a B-type rotational viscometer (TV-10H, manufactured by Toki Sangyo Co., Ltd.). The measurement conditions were as follows: rotor, H3; rotor speed, 2.5 to 100 $min^{-1}$; and the composition temperature, adjusted to the discharge temperature.

Example 1

32 parts by weight of toluene diisocyanate (a mixture of 2,4-diisocyanate/2,6-diisocyanate=80/20, TDI-80), 8 parts by weight of 4,4'-dicyclohexylmethane diisocyanate (HMDI), 54 parts by weight of polytetramethylene glycol (number average molecular weight: 1006, PTMG-1000), and 6 parts by weight of diethylene glycol (DEG) were mixed, and stirred and heated at 80° C. for 120 minutes so that an isocyanate-terminated prepolymer (2.1 meq/g in isocyanate equivalent) was prepared. 100 parts by weight of the isocyanate-terminated prepolymer and 3 parts by weight of a silicone surfactant (SH-192, manufactured by Dow Corning Toray Co., Ltd.) were mixed to prepare a mixture A which was controlled to have a temperature of 80° C. In a mixing chamber, 80 parts by weight of the mixture A and 20 parts by weigh of 4,4'-methylenebis(o-chloroaniline) (Iharacuamine MT, manufactured by Ihara Chemical Industry Co., Ltd.) melted at 120° C. were mixed, and at the same time, air was dispersed into the mixture by mechanical stirring so that a cell-dispersed urethane composition A was prepared.

Preparation of Light Transmitting Region-Forming Material

TDI-80 (28 parts by weight), HMDI (3 parts by weight), PTMG-1000 (67 parts by weight), and DEG (2 parts by weight) were mixed. The mixture was heated and stirred at 80° C. for 120 minutes to form an isocyanate-terminated prepolymer. The isocyanate-terminated prepolymer (100 parts by weight) controlled to have a temperature of 60° C. was mixed with Iharacuamine MT (19 parts by weight) melted at 120° C. to form a light transmitting region-forming material B.

While a release-treated face material (thickness: 188 μm, width: 100 cm) made of a PET film was fed, the light transmitting region-forming material B (65° C., viscosity: 2.5 Pa·s) was continuously discharged from a discharge head onto the center of the face material, and the cell-dispersed urethane composition A (80° C., viscosity: 1 Pa·s) was continuously discharged from a mixing head onto the other part of the face material. The light transmitting region-forming material B and the cell-dispersed urethane composition A were covered with another release-treated face material (thickness: 188 μm, width: 100 cm) made of a PET film, and the thickness was controlled to be uniform by means of a nip roll. Both compositions were cured by heating to 80° C. so that a long polishing layer (thickness: 2 mm) was prepared in which a light transmitting region (width: about 1 cm) and a polishing region that was made of a polyurethane foam were integrated therewith. The long polishing layer was primarily cut into 80 cm square pieces, and then both face materials were separated. The resulting piece was post-cured at 80° C. for 6 hours and secondarily cut into a 70 cm diameter polishing layer. The polishing layer surface was then buffed with a buffing machine (manufactured by AMITEC Corporation) so that the thickness accuracy was adjusted. The polishing layer surface was then grooved using a grooving machine (manufactured by Toho Koki Co., Ltd.), and a cushion layer was laminated on the back side of the polishing layer so that a polishing pad was obtained.

Example 2

While a release-treated face material (thickness: 188 μm, width: 100 cm) made of a PET film was fed, the light transmitting region-forming material B (65° C., viscosity: 2.5 Pa·s) was intermittently discharged from a discharge head onto the center of the face material, and the cell-dispersed urethane composition A (80° C., viscosity: 1 Pa·s) was continuously discharged from a mixing head onto the other part of the face material. The light transmitting region-forming material B and the cell-dispersed urethane composition A were covered with another release-treated face material (thickness: 188 μm thick, width: 100 cm) made of a PET film, and the thickness was controlled to be uniform by means of a nip roll. Both compositions were cured by heating to 80° C. so that a long polishing layer (thickness: 2 mm) was prepared in which a large number of light transmitting regions (width: about 1.5 cm, length: about 4 cm) and a polishing region that was made of a polyurethane foam were integrated therewith. The long polishing layer was primarily cut into 80 cm square pieces, and then both face materials were separated. The resulting piece was post-cured at 80° C. for 6 hours and secondarily cut into a 70 cm diameter polishing layer. The polishing layer surface was then buffed with a buffing machine (manufactured by AMITEC Corporation) so that the thickness accuracy was adjusted. The polishing layer surface was then grooved using a grooving machine (manufactured by Toho Koki Co., Ltd.), and a cushion layer was laminated on the back side of the polishing layer so that a polishing pad was obtained.

Example 3

While a cushion layer (width: 100 cm) was fed that was made of a polyethylene foam (Toraypef, manufactured by Toray Industries, Inc.) with its surface buffed and its thickness controlled to 0.8 mm and had a 1 cm-wide continuous through hole at its center, the light transmitting region-forming material B (65° C., viscosity: 2.5 Pa·s) was continuously discharged from a discharge head so as to be deposited in and on the through hole, and the cell-dispersed urethane composition A (80° C., viscosity: 1 Pa·s) was continuously discharged from a mixing head onto the other part of the cushion layer. The light transmitting region-forming material B and the cell-dispersed urethane composition A were then covered with a release-treated face material (thickness: 188 μm, width: 100 cm) made of a PET film, and the thickness was controlled to be uniform by means of a nip roll. Both compositions were then cured by heating to 80° C. so that a long laminated sheet (thickness of polishing layer: 2 mm) was prepared in which a light transmitting region (width of the polishing surface side: about 1.5 cm) and a polishing region that was made of a polyurethane foam were integrated therewith. The long laminated sheet was primarily cut into 80 cm square pieces, and then the face material was separated. The resulting piece was post-cured at 80° C. for 6 hours and secondarily cut into a 70 cm diameter laminated polishing sheet. The surface of the polishing sheet was then buffed with a buffing machine (manufactured by AMITEC Corporation) so that the thickness accuracy was adjusted. The polishing layer surface of the laminated polishing sheet was then grooved using a grooving machine (manufactured by Toho Koki Co., Ltd.) so that a laminated polishing pad was obtained.

Example 4

While a cushion layer (width: 100 cm) was fed that was made of a polyethylene foam (Toraypef manufactured by Toray Industries, Inc.) with its surface buffed and its thickness controlled to 0.8 mm and had a large number of 1 cm-wide, 4 cm-long through holes at its center at regular intervals, the light transmitting region-forming material B (65° C., viscosity: 2.5 Pa·s) was intermittently discharged from a discharge head so as to be deposited in and on the through holes, and the cell-dispersed urethane composition A (80° C., viscosity: 1 Pa·s) was continuously discharged from a mixing head onto the other part of the cushion layer. The light transmitting region-forming material B and the cell-dispersed urethane composition A were then covered with a release-treated face material (thickness: 188 μm, width: 100 cm) made of a PET film, and the thickness was controlled to be uniform by means of a nip roll. Both compositions were then cured by heating to 80° C. so that a long laminated sheet (thickness of polishing layer: 2 mm) was prepared in which light transmitting regions (width of the polishing surface side: about 1.5 cm, length: about 4 cm) and a polishing region that was made of a polyurethane foam and integrated with the light transmitting regions. The long laminated sheet was primarily cut into 80 cm square pieces, and then the face material was separated. The resulting piece was post-cured at 80° C. for 6 hours and secondarily cut into a 70 cm diameter laminated polishing sheet. The surface of the polishing sheet was then buffed with a buffing machine (manufactured by AMITEC Corporation) so that the thickness accuracy was adjusted. The polishing layer surface of the laminated polishing sheet was then grooved using a grooving machine (manufactured by Toho Koki Co., Ltd.) so that a laminated polishing pad was obtained.

Fourth Invention

Example 1

32 parts by weight of toluene diisocyanate (a mixture of 2,4-diisocyanate/2,6-diisocyanate=80/20), 8 parts by weight of 4,4'-dicyclohexylmethane diisocyanate, 54 parts by weight of polytetramethylene glycol (number average molecular weight: 1006), and 6 parts by weight of diethylene glycol were mixed, and stirred and heated at 80° C. for 120 minutes so that an isocyanate-terminated prepolymer (2.1 meq/g in isocyanate equivalent) was prepared. 100 parts by weight of the isocyanate-terminated prepolymer and 3 parts by weight of a silicone surfactant (SH-192, manufactured by Dow Corning Toray Co., Ltd.) were mixed to prepare a mixture A which was controlled to have a temperature of 80° C. In a mixing chamber, 80 parts by weight of the mixture A and 20 parts by weigh of 4,4'-methylenebis(o-chloroaniline) (Iharacuamine MT, manufactured by Ihara Chemical Industry Co., Ltd.) melted at 120° C. were mixed, and at the same time, air was dispersed into the mixture by mechanical stirring so that a cell-dispersed urethane composition was prepared.

While a release-treated conveyor belt (material: urethane, width: 110 cm) whose surface had regularly-formed rectangular recessed-structures (width: 13 mm, length: 13 mm, depth 0.8 mm) was allowed to transfer rotationally, the cell-dispersed urethane composition was continuously discharged onto the conveyor belt. The cell-dispersed urethane composition was then covered with a release-treated face material (thickness: 188 μm, width: 100 cm) made of a PET film, and the thickness was controlled to be uniform by means of a nip roll. The composition was then cured by heating to 80° C. so that a groove-carrying long polishing layer (thickness: 2 mm) made of a polyurethane foam was obtained. The groove-carrying long polishing layer was then separated from the conveyor belt. The groove-carrying long polishing layer was primarily cut into 80 cm square pieces, and then the face material was separated. The resulting piece was post-cured at 80° C. for 6 hours and secondarily cut into a groove-carrying, 70 cm-diameter, polishing layer. The surface of the polishing layer was then buffed with a buffing machine (manufactured by AMITEC Corporation) so that the thickness accuracy was adjusted. A cushion layer was then laminated on the back side of the groove-carrying polishing layer, so that a groove-carrying laminated polishing pad was obtained.

Example 2

While a release-treated release sheet (material: PET, width: 100 cm) whose surface had regularly-formed rectangular recessed-structures (width: 43 mm, length: 43 mm, depth: 0.3 mm) was fed, spacers were provided on both ends parts of the release sheet. The cell-dispersed urethane composition was then continuously discharged onto the release sheet. The cell-dispersed urethane composition was then covered with a cushion layer (thickness: 0.8 mm, width: 100 cm) made of a polyethylene foam (Toraypef, manufactured by Toray Industries, Inc.), and the thickness was controlled to be uniform by means of a nip roll. The composition was then cured by heating to 80° C. so that a groove-carrying long polishing layer made of a polyurethane foam was formed, and as a result, a groove-carrying long laminated sheet (thickness of the polishing layer: 1.5 mm) was obtained. The groove-carrying long laminated sheet was then primarily cut into 80 cm square pieces, and then the release sheet was separated. The resulting piece was post-cured at 80° C. for 6 hours and secondarily cut into a 70 cm diameter piece. The surface of the resulting laminated sheet was then buffed with a buffing machine (manufactured by AMITEC Corporation) so that the thickness accuracy was adjusted. As a result, a groove-carrying laminated polishing pad was obtained.

The invention claimed is:

1. A method for manufacturing a laminated polishing pad, comprising the steps of:
    preparing a cell-dispersed urethane composition by a mechanical foaming method;
    feeding a cushion layer in a feeding direction;
    while feeding the cushion layer, feeding in the feeding direction a first spacer on the cushion layer so as to be at one end of a width direction of the cushion layer, feeding in the feeding direction a second spacer on the cushion layer so as to be at other end of the width direction of the cushion layer, and feeding in the feeding direction a third spacer on the cushion layer so as to be between the first and second spacers;
    continuously discharging said cell-dispersed urethane composition onto a part of said cushion layer where the spacers are not provided;
    laminating a face material on said discharged cell-dispersed urethane composition;
    curing the cell-dispersed urethane composition to form a polishing layer comprising a polyurethane foam, while controlling its thickness to be uniform, so that a long laminated sheet is formed; and
    cutting the long laminated sheet.

2. The method according to claim 1, wherein one of the spacers comprises a thermoplastic resin or a thermosetting resin.

3. The method according to claim 1, wherein the third spacer is inserted in a through hole of the cushion layer and provided so as to protrude from the cushion layer.

4. The method according to claim 3, wherein the third spacer has a light transmittance of at least 20% over the wavelength range of 400 nm to 700 nm.

5. The method according to claim 1, wherein one of the spacers comprises a polyurethane foam whose composition is the same as that of said cell-dispersed urethane composition.

6. The method according to claim 1, wherein the third spacer is a laminate comprising at least two peelable resin sheets.

\* \* \* \* \*